United States Patent
Earnshaw et al.

(10) Patent No.: US 9,820,244 B2
(45) Date of Patent: Nov. 14, 2017

(54) TIME-ADVANCED RANDOM ACCESS CHANNEL TRANSMISSION

(75) Inventors: Andrew Mark Earnshaw, Kanata (CA); Jianfeng Weng, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 178 days.

(21) Appl. No.: 13/984,617

(22) PCT Filed: Feb. 11, 2011

(86) PCT No.: PCT/CA2011/050082
§ 371 (c)(1),
(2), (4) Date: Oct. 17, 2013

(87) PCT Pub. No.: WO2012/106798
PCT Pub. Date: Aug. 16, 2012

(65) Prior Publication Data
US 2014/0044108 A1 Feb. 13, 2014

(51) Int. Cl.
*H04W 56/00* (2009.01)
*G01S 5/00* (2006.01)
(Continued)

(52) U.S. Cl.
CPC ......... *H04W 56/001* (2013.01); *G01S 5/0063* (2013.01); *H04W 24/00* (2013.01); *H04W 56/0045* (2013.01); *H04W 74/08* (2013.01)

(58) Field of Classification Search
CPC . H04W 74/08; H04W 24/00; H04W 56/0045; H04W 56/001
See application file for complete search history.

(56) References Cited

U.S. PATENT DOCUMENTS

| 7,363,009 B2 | 4/2008 | Erlenbach et al. |
| 2004/0152421 A1* | 8/2004 | Erlenbach ............. H04J 3/0682 455/67.11 |

(Continued)

FOREIGN PATENT DOCUMENTS

| CN | 101416556 | 4/2009 |
| CN | 101621843 | 1/2010 |

(Continued)

OTHER PUBLICATIONS

Partial European Search Report issued in European Application No. 11858034.9 dated Jan. 7, 2015; 5 pages.

(Continued)

*Primary Examiner* — Lakeram Jangbahadur
(74) *Attorney, Agent, or Firm* — Fish & Richardson P.C.

(57) ABSTRACT

Systems and methods can be implemented on a wireless device and base stations to facilitate uplink synchronization. The wireless device can transmit a random access preamble to at least one base station serving the wireless device to initiate a random access procedure. The wireless device can identify a signal propagation time associated with the position of the wireless device and the position of the at least one base station serving the wireless device. The wireless device can also identify a positive time advance based on the identified signal propagation time for transmitting the random access preamble. Further, the wireless device can transmit the random access preamble to the at least one base station based on the identified time advance for random access.

20 Claims, 15 Drawing Sheets

(51) Int. Cl.
*H04W 24/00* (2009.01)
*H04W 74/08* (2009.01)

(56) References Cited

U.S. PATENT DOCUMENTS

| | | | |
|---|---|---|---|
| 2006/0280200 A1* | 12/2006 | Lane | H04W 56/0045 370/458 |
| 2007/0230600 A1 | 10/2007 | Bertrand et al. | |
| 2010/0074202 A1* | 3/2010 | Park | H04W 56/004 370/329 |
| 2010/0222068 A1* | 9/2010 | Gaal | H04W 56/0045 455/450 |
| 2011/0007719 A1 | 1/2011 | Lee | |
| 2011/0039499 A1* | 2/2011 | Zhang | H04W 74/008 455/67.11 |

FOREIGN PATENT DOCUMENTS

| | | | |
|---|---|---|---|
| EP | 1501325 | 1/2005 | |
| EP | 2068475 | 6/2009 | |
| ES | WO2007117186 | * 10/2007 | ............... H04Q 7/38 |
| WO | 2007/117186 | 10/2007 | |

OTHER PUBLICATIONS

International Search Report and Written Opinion of the International Searching Authority issued in International Application No. PCT/CA2011/050082 dated May 6, 2011.
International Preliminary Report on Patentability issued in International Application No. PCT/CA2011/050082 dated Aug. 13, 2013; 7 pages.
Extended European Search Report in European Application No. 11858034, dated Jun. 23, 2015, 12 pages.
Canadian Office Action in Canadian Application No. 2,827,218, dated Jan. 22, 2015, 3 pages.
English translation of Chinese document were not provided.
Office Action issued in Chinese Application No. 201180067350.4 dated May 31, 2016.
Office Action issued in Chinese Application No. 201180067350.4 dated Oct. 25, 2016.

* cited by examiner

```
RadioResourceConfigCommonSIB ::=    SEQUENCE {
  rach-ConfigCommon                   RACH-ConfigCommon,
  bcch-Config                         BCCH-Config,
  pcch-Config                         PCCH-Config,
  prach-Config                        PRACH-ConfigSIB,
  pdsch-ConfigCommon                  PDSCH-ConfigCommon,
  pusch-ConfigCommon                  PUSCH-ConfigCommon,
  pucch-ConfigCommon                  PUCCH-ConfigCommon
  soundingsRS-UL-ConfigCommon         SoundingRS-UL-ConfigCommon,
  uplinkPowerControlCommon            UplinkPowerControlCommon,
  ul-CyclicPrefixLength               UL-CyclicPrefixLength,
  rach-ConfigCommonUeTA               RACH-ConfigCommon,
  prach-ConfigUeTA                    PRACH-ConfigSIB,
  ...
}
```
⎫
⎬ 900
⎭

FIG. 9

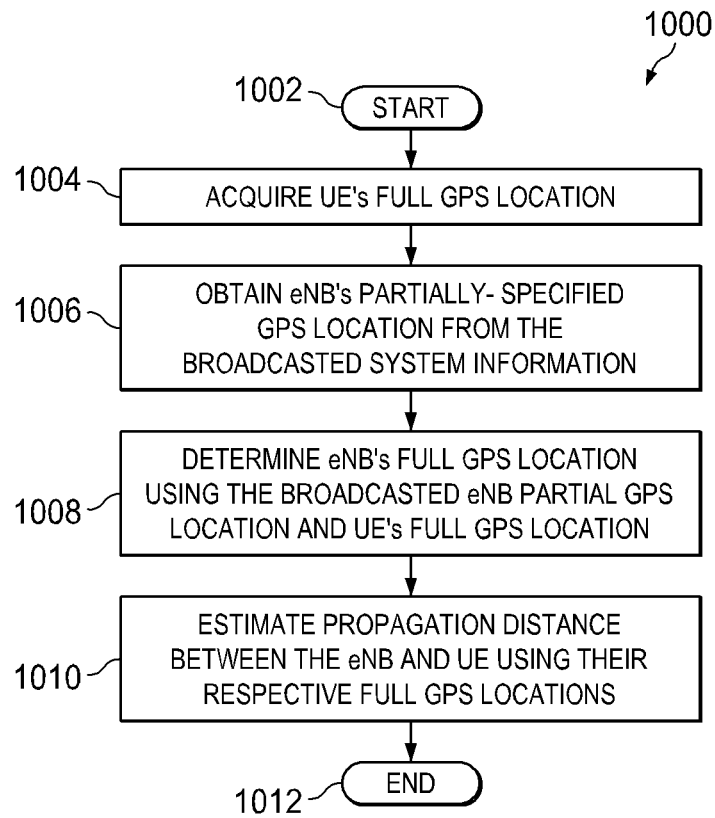

TIME-ADVANCED RANDOM ACCESS CHANNEL TRANSMISSION

CLAIM OF PRIORITY

This application is a U.S. National Stage of PCT/CA2011/050082 filed on Feb. 11, 2011.

TECHNICAL FIELD

This invention relates to determining initial time advances for uplink transmissions when a wireless device is synchronizing to a network device.

BACKGROUND

Communication networks include wired and wireless networks. Example wired networks include the Public Switched Telephone Network (PSTN) and the Ethernet. Example wireless networks include cellular networks as well as unlicensed wireless networks that connect to wired networks. Calls and other communications may be connected across wired and wireless networks.

DESCRIPTION OF DRAWINGS

FIG. 9 is an illustration of an example PRACH configuration for the selection of PRACH preamble formats.

FIG. 10 is a flowchart illustrating the estimation of signal propagation distance at the UE based on the partial GPS location information broadcasted by the eNB.

Like reference symbols in the various drawings indicate like elements.

DETAILED DESCRIPTION

Figure 1:
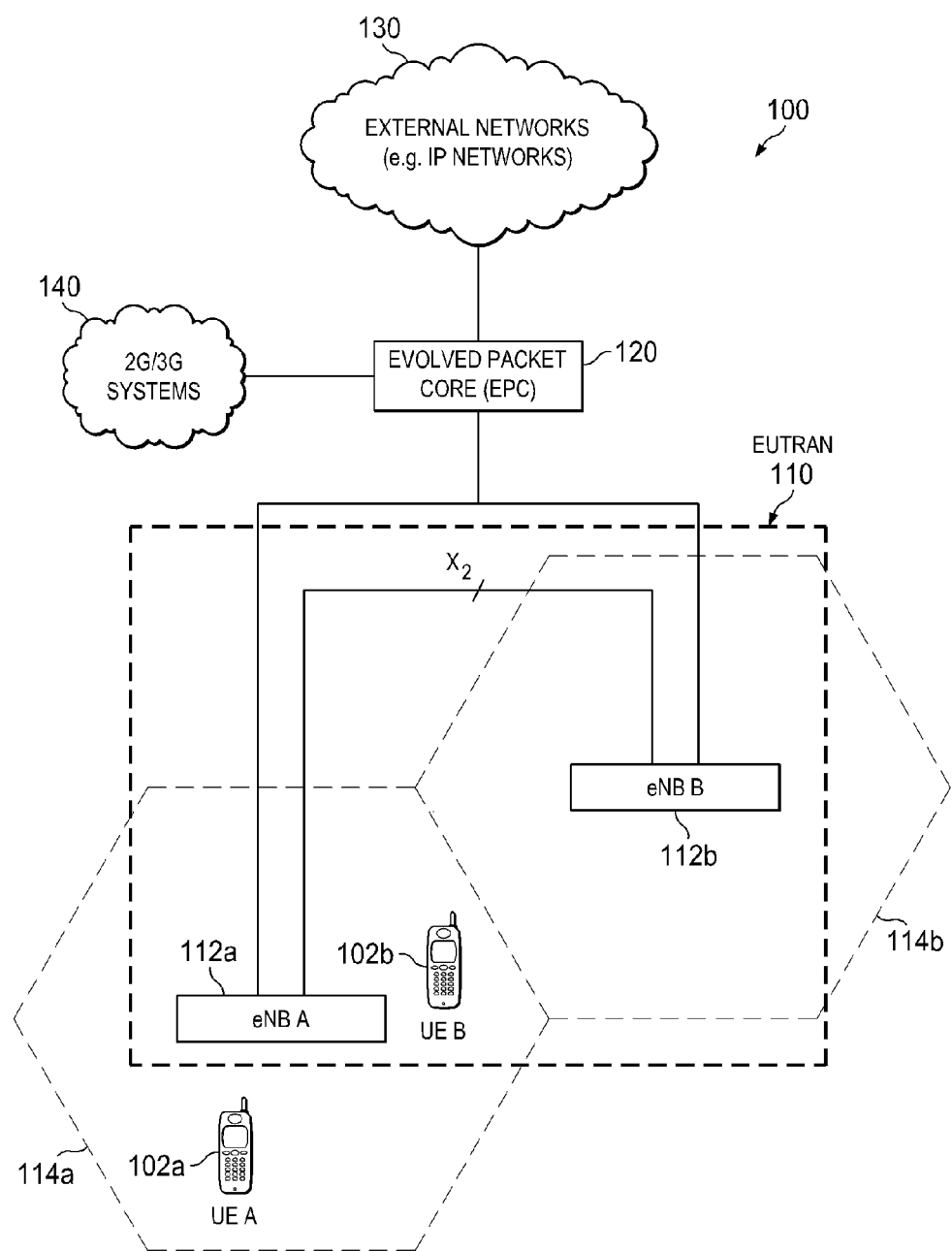
FIG. 1 is a schematic representation of an example wireless cellular communication system based on 3GPP long term evolution (LTE).

The present disclosure provides for systems, methods, and apparatuses relating to wireless communications and more particularly, to facilitating mobile cellular network uplink time synchronization. A cellular network can be a radio network distributed over land areas called cells. Each of the cells can be served by at least one base station. The base station can be a fixed-location transceiver. Wireless electronic devices operated by users in cellular networks can communicate with each other by transmitting and/or receiving signals via their respective serving base station(s). In certain implementations, the portion of the communication link used for the transmission of signals from a wireless electronic device to its serving base station is referred to as an uplink. A downlink is the inverse of an uplink in the sense that the downlink is used for the transmission of signals from a serving base station to a wireless electronic device. Wireless electronic devices operating in a cell can be located in different positions of the cell. Thus, the uplink signals transmitted to the serving base station(s) can propagate through different paths with different propagation time for different wireless devices. In some implementations, uplink signals from different wireless devices can arrive at the base stations substantially synchronized, which assists in executing signal detection. In some implementations, different wireless devices in a cell can transmit uplink signals with different time advances relative to the downlink signal received at each wireless device such that the signals may arrive substantially synchronized at the base station (detailed illustration can be found in FIG. 3). The time advances for different wireless devices may be associated with their respective uplink signal propagation time. In some implementations, the wireless devices can acquire their time advance through a random access procedure. In these instances, the wireless device may initiate a random access procedure by transmitting, with zero time advance, a preamble on the physical random access channel (PRACH). The preamble may comprise a cyclic prefix prepended to at least one preamble sequence. In certain implementations, the length of the cyclic prefix and the cyclic shift of the preamble sequence can be large enough for the base station to be able to identify different preamble sequences transmitted from different wireless devices. When an evolved Node B (eNB) detects a preamble, the eNB may determine the identity of the preamble sequence and the associated timing adjustment information that can be used for uplink synchronization. This timing adjustment information may be communicated to the wireless device or User Equipment (UE) which transmitted the identified preamble sequence during the following stage of the random access procedure. After completing the random access procedure, the UE may transmit uplink signals substantially synchronized with other UEs as received by the eNB by using the timing adjustment information supplied by the eNB.

The present disclosure facilitates random access procedures for uplink synchronization. In particular, an initial approximate time advance for non-uplink synchronized user equipment may be determined by the user equipment before the transmission of a random access preamble to the base station. In some implementations, the user equipment may receive, from the base station, a broadcast signal based on Global Positioning System (GPS) signals received by the base station. The broadcast signal may include GPS base station location information, include GPS time information, be synchronized with the GPS signals, and/or otherwise be associated with GPS signals. Based, at least in part, on the received broadcast signal, the user equipment may transmit a random access preamble to the base station in accordance with the UE-determined initial time advance. The UE-determined time advance used in the preamble transmission may result in the preambles from different UEs to arrive substantially synchronously at the serving base station. By having a UE determine an initial time advance prior to the transmission of a random access preamble to the base station, the length of the cyclic prefix may be minimized or otherwise reduced and still be sufficient to cover the residual time delays of the time-advanced preambles for different UEs. Similarly, the length of the cyclic shift between different preamble sequences may be reduced. The reduction of the cyclic prefix length may result in a reduction of total transmission power used by the UEs in random access procedures. Further, provisioning different preamble sequences with a reduced-length cyclic shift may simplify the preamble generation and detection and improve the preamble detection performance at the base station, which may also reduce the number of random access preamble retransmissions by UEs and in turn reduce the total transmission power used by UEs when performing a random access procedure.

The wireless electronic devices described above may be operated in a cellular network, such as the network shown in FIG. 1, which is based on the third generation partnership project (3GPP) long term evolution (LTE), also known as Evolved Universal Terrestrial Radio Access (E-UTRA). More specifically, FIG. 1 is a schematic representation of an example wireless cellular communication system 100 based on 3GPP LTE. The LTE system 100 shown in FIG. 1 includes a plurality of base stations 112. In the LTE example of FIG. 1, the base stations are shown as evolved Node Bs (eNBs) 112, which are to be understood as the evolved base transceiver stations or base stations. The eNBs 112 can communicate with one or more wireless electronic devices 102 wirelessly. The wireless electronic device is shown as user equipment (UE) 102 in the example FIG. 1. The eNBs 112 may also communicate with each other by X2 communication interfaces. One of the main functions of the X2 interface is for support of handover, which can be referred to as the process of transferring the ongoing communication between a UE 102 and a source base station to a target base station. For example, handover may occur if UE 102a, UE 102b or both travel from Cell 114a to Cell 114b. The example LTE system 100 of FIG. 1 may include one or a plurality of radio access networks 110, core networks 120 and external networks 130. In certain implementations, the radio access networks may be evolved Universal Mobile Telecommunications System (UMTS) terrestrial radio access networks (EUTRANs). In addition, in certain instances, core networks 120 may be evolved packet cores (EPCs). Further, there may be one or more UEs operating within the LTE system 100. In some implementations, 2G/3G systems 140, e.g., Global System for Mobile communication (GSM), Interim Standard 95 (IS-95), Universal Mobile Telecommunications System (UMTS) and CDMA2000 (Code Division Multiple Access) may also be integrated into the LTE telecommunication system.

In the example LTE system shown in FIG. 1, the EUTRAN 110 comprises eNB 112a and eNB 112b. Cell 114a is the service area of eNB 112a and Cell 114b is the service area of eNB 112b. UE 102a and 102b operate in Cell 114a and are served by eNB 112a. The EUTRAN 110 can comprise one or a plurality of eNBs 112 and one or a plurality of UEs can operate in a cell. The eNBs 112 communicate directly to the UEs 102. In some implementations, the eNB 112 may be in a one-to-many relationship with the UE 102, e.g., eNB 112a in the example LTE system 100 can serve multiple UEs 102 (i.e., UE 102a and UE 102b) within its coverage area Cell 114a, but each of UE 102a and UE 102b may be connected only to one eNB 112a at a time. In some implementations, the eNB 112 may be in a many-to-many relationship with the UEs 102, e.g., UE 102a and UE 102b can be connected to eNB 112a and eNB 112b. The eNB 112a may be connected to eNB 112b with which handover may be conducted if one or both of UE 102a and UE 102b travels from eNB 112a to eNB 112b. UE 102 may be any wireless electronic device used by an end-user to communicate, for example, within the LTE system 100. The UE 102 may be referred to as mobile electronic device, user device, mobile station, subscriber station, or wireless terminal. UE 102 may be a cellular phone, personal data assistant (PDA), smart phone, laptop, tablet personal computer (PC), pager, portable computer, or other wireless communications device.

Figure 2:
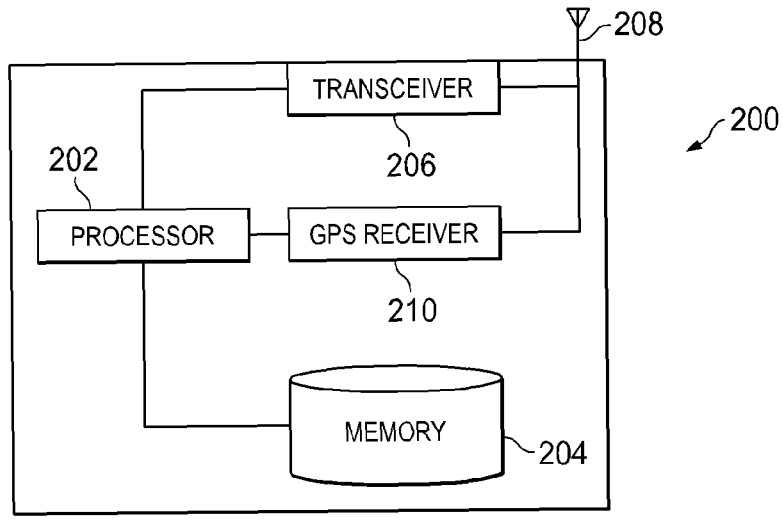
FIG. 2 is a schematic illustrating the architecture of example user equipment (UE).

Turning briefly to FIG. 2, each UE 102 may be any electronic device operable to receive and transmit wireless signals in the LTE system 100. FIG. 2 is a schematic illustrating the architecture of example UE. UE 102 may include a processor 202, a memory 204, a wireless transceiver 206, an antenna 208 and a global positioning system (GPS) receiver 210. The processor 202 may comprise a microprocessor, central processing unit, graphic control unit, network processor, or other processor for carrying out instructions stored in memory 204. The functions of the processor 202 may include computation, queue management, control processing, graphic acceleration, video decoding, and execution of a sequence of stored instructions from the program kept in the memory module 204. In some implementations, the processor 202 may also be responsible for signal processing including sampling, quantizing, encoding/decoding, and/or modulation/demodulation of the signal. The memory module 204 may include a temporary state device (e.g., random-access memory (RAM)) and data storage. The memory module 204 can be used to store data or programs (i.e., sequences of instructions) on a temporary or permanent basis for use in a UE. The wireless transceivers 206 can include both the transmitter circuitry and the receiver circuitry. The wireless transceivers 206 may be responsible for up-converting a baseband signal to a passband signal or vice versa. The components of wireless transceivers 206 may include a digital to analog converter/analog to digital converter, amplifier, frequency filter and oscillator. The antenna 208 is a transducer which can transmit and/or receive electromagnetic waves. Antenna 208 can convert electromagnetic radiation into electric current, or vice versa. Antenna 208 is generally responsible for the transmission and reception of radio waves, and can serve as the interface between the transceiver 206 and the wireless channel.

In certain implementations, the UE 102 may also include a GPS receiver 210. The GPS receiver 210 can be operable to receive signals from multiple GPS satellites orbiting the earth and determine the GPS location and GPS time of the UE 102 based, at least in part, on the received GPS signals. More specifically, after picking up the radio waves from the antenna 208, the GPS receiver 210 may determine a distance the signals traveled by timing how long it takes for the radio waves to arrive from the GPS transmitter and multiplying the travel time by the speed of light. The geographic location, such as the longitude and the latitude, of the GPS receiver 210 may be determined by geometrical calculation using the distance information from multiple satellites. Further, the GPS receiver 210 may adjust an internal clock to the GPS time by measuring the timing of incoming signals from multiple GPS satellites.

Returning to FIG. 1, in some implementations, the eNB 112 can also comprise a GPS receiver. The eNB 112 can determine its GPS location and/or time using substantially similar methods to the UE 102. The eNB 112 may include GPS information comprising at least a portion of its GPS location and/or GPS time in the broadcast system information. The broadcast system information from the eNB 112 can be picked up by the UE 102 antenna 208, downconverted to the baseband by the transceiver 206 and decoded by the UE processor 202, shown in FIG. 2. The UE processor 202 of FIG. 2 can combine the GPS information received from the eNB 112 and its own GPS information determined by the GPS receiver 210 to estimate the signal propagation time from the eNB 112 to the UE 102.

Continuing with the illustration of FIG. 1, functionally, the UEs 102 may be used as a platform for different applications of communications. For example, the UEs 102 may be used for interacting with the cellular network by transmitting/receiving signals for initiating, maintaining or terminating the communications according to the end-user requests. UEs 102 may also include mobility management functions such as handovers and reporting their location, in which UEs 102 perform as instructed by the cellular network. In some implementations, UEs 102 may transmit in one or more cellular bands. One or multiple UEs 102 may be communicably coupled to the eNBs 112. In these cases, messages transmitted and/or received by UEs 102 may be based on a multiple access technology. In some implementations, the UEs 102 are configured to use orthogonal frequency division multiple access (OFDMA) technology or single carrier-frequency division multiple access (SC-FDMA) technology to communicate with the eNBs 112. In some other implementations, eNBs 112 may also accommodate UEs 102 using multiple access technologies such as time division multiple access (TDMA), frequency division multiple access (FDMA) and code division multiple access (CDMA).

The UEs 102 may transmit voice, video, multimedia, text, web content and/or any other user/client-specific content. On the one hand, the transmission of some of these contents, e.g., video and web content, may use high channel throughput to satisfy the end-user demand. On the other hand, the channel between the UEs 102 and eNBs 112 may be contaminated by multipath fading, due to the multiple signal paths arising from many reflections in the wireless environment. In some implementations, the UEs 102 and/or eNBs 112 may also be equipped with multiple antennas to take advantage of the multiple-input-multiple-output (MIMO) technology. MIMO technology may provide a process to utilize the multiple signal paths to reduce the impact of multipath fading and/or to improve the throughput. By using multiple antennas at the UEs 102 and/or eNBs 112, MIMO technology may enable the system to set up multiple parallel data streams for the same data channel, thereby increasing the throughput of the data channel. In short, UEs 102 generate requests, responses or otherwise communicate in different means with Enhanced Packet Core (EPC) 120 and/or Internet Protocol (IP) networks 130 through one or more eNBs 112.

A radio access network is part of a mobile telecommunication system which implements a radio access technology, such as UMTS, CDMA2000 and 3GPP LTE. In many applications, the Radio Access Network (RAN) included in an LTE system 100 is called an EUTRAN 110. The EUTRAN 110 can be located between the UEs 102 and EPC 120. The EUTRAN 110 includes at least one eNB 112. The eNB can be a radio base station that may control all or at least some radio related functions in a fixed part of the system. At least one eNB 112 or a plurality of eNBs 112 provide radio interface within their coverage area or a cell for the UEs 102 to communicate. eNBs 112 may be distributed throughout the cellular network to provide a wide area of coverage. The eNB 112 directly communicates to one or a plurality of UEs 102, other eNBs 112, and the EPC 120. In some implementations, base stations can also include relay nodes or Radio Frequency (RF) repeaters which serve to relay wireless communications between eNBs 112 and UEs 102. The term eNB is used herein to refer to any network access device which communicates wirelessly with a UE and may include, but is not limited to, eNBs, relay nodes, RF repeaters, and base stations.

The eNB 112 may be the end point of the radio protocols towards the UE 102 and may relay signals between the radio connection and the connectivity towards the EPC 120. In certain implementations, the EPC 120 is the main component of a core network (CN). The CN can be a backbone network, which may be a central part of the telecommunications system. The EPC 120 can include a mobility management entity (MME), a serving gateway (SGW), and a packet data network gateway (PGW). The MME may be the main control element in the EPC 120 responsible for the functionalities comprising the control plane functions related to subscriber and session management. The SGW can serve as a local mobility anchor, such that the packets are routed through this point for intra EUTRAN 110 mobility and mobility with other legacy 2G/3G systems 140. The SGW functions may include the user plane tunnel management and switching. The PGW may provide connectivity to the services domain comprising external networks 130, such as the IP networks. The UE 102, EUTRAN 110, and EPC 120 are sometimes referred to as the evolved packet system (EPS). It is to be understood that the architectural evolvement of the LTE system 100 is focused on the EPS. The functional evolution may include both EPS and external networks 130.

Though described in terms of FIG. 1, the present disclosure is not limited to such an environment. For example, the system 100 is described as an LTE system but may be described as a wireless cellular system, a cellular network environment, LTE cellular network environment, an LTE system, a telecommunications environment, and/or an LTE telecommunication system without departing from the scope of this disclosure. In general, cellular telecommunication systems may be described as cellular networks made up of a number of radio cells, or cells that are each served by a base station or other fixed transceiver. The cells are used to cover different areas in order to provide radio coverage over an area. Example cellular telecommunication systems include Global System for Mobile Communication (GSM) protocols, Universal Mobile Telecommunications System (UMTS), 3GPP Long Term Evolution (LTE), and others.

Figure 3:
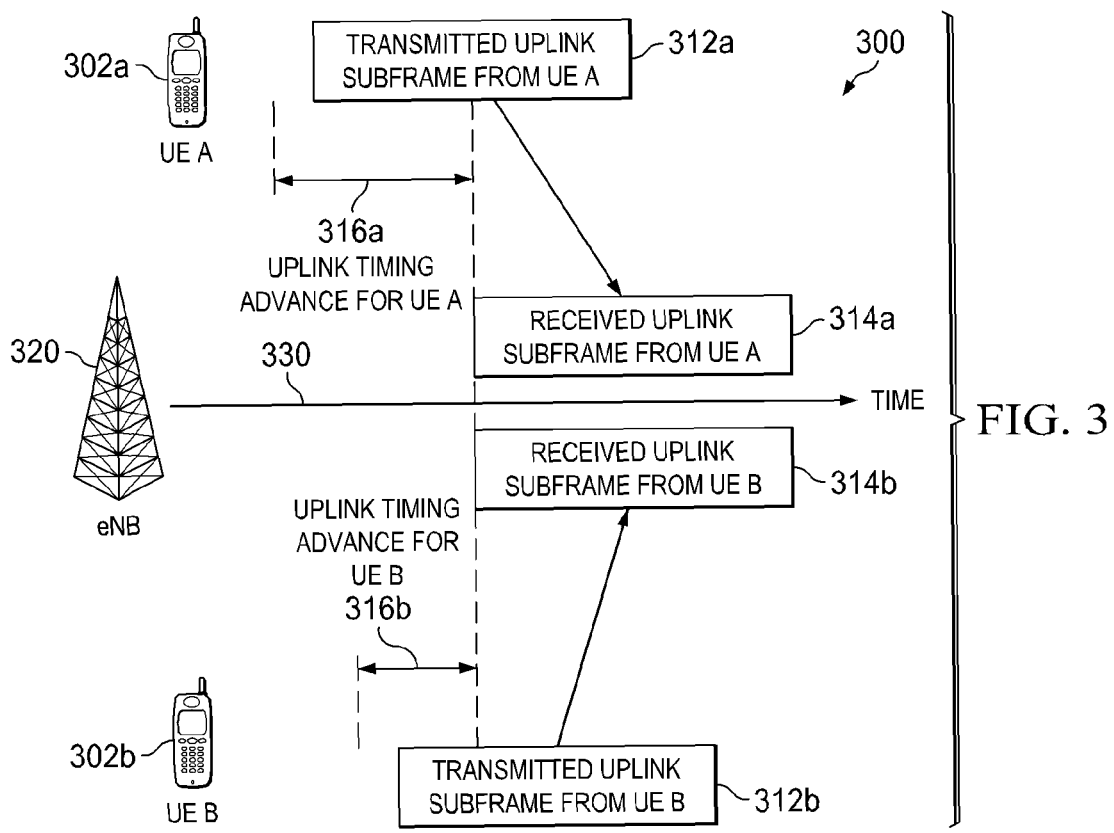
FIG. 3 is a schematic illustrating an example cellular network uplink communication where different UEs transmit uplink signals with different time advances to achieve uplink synchronization at the eNB.

FIG. 3 is a schematic illustrating an example cellular network uplink communication where different UEs transmit uplink signals with different time advances to achieve uplink synchronization at the receiver. In some implementations of the LTE system, the UEs use SC-FDMA modulation technology to transmit the uplink signals. SC-FDMA can be a hybrid scheme that combines the traditional single-carrier formats, such as TDMA used in GSM, and the multiple access modulation method used in OFDMA. The uplink signal transmitted in the LTE system can be divided into frames in the time domain. Each of the frames can be further divided into multiple subframes and each of the subframes may include multiple SC-FDMA symbols. The SC-FDMA symbols for different users may be modulated to frequency subcarriers which are mutually orthogonal in order to reduce the amount of mutual interference. In some implementations, in order to maintain the orthogonality between different subframes carrying uplink SC-FMDA symbols for different UEs, the eNB may control the UEs' timing so that the subframes of the uplink signals can arrive at the eNB in a substantially synchronized fashion. Returning to the example 300 shown in FIG. 3, UE 302a may be located further away from the eNB 320 than UE 302b. Accordingly, the uplink signal propagation time for UE 302a may be longer than for UE 302b. Thus, UE 302a may transmit each of its uplink subframes 312a with an uplink time advance 316a greater than the time advance 316b used in the transmission of UE B's 302b subframe 312b. Therefore, the received subframe 314a from UE 302a and the received subframe 314b from UE 302b may arrive at the eNB 320 synchronously. Note that the uplink time advances may not be strictly related to the physical distance between a UE and an eNB, since the actual signal propagation path may vary with different physical locations especially if there is no line of sight connection between the UE and the eNB.

Figure 4:
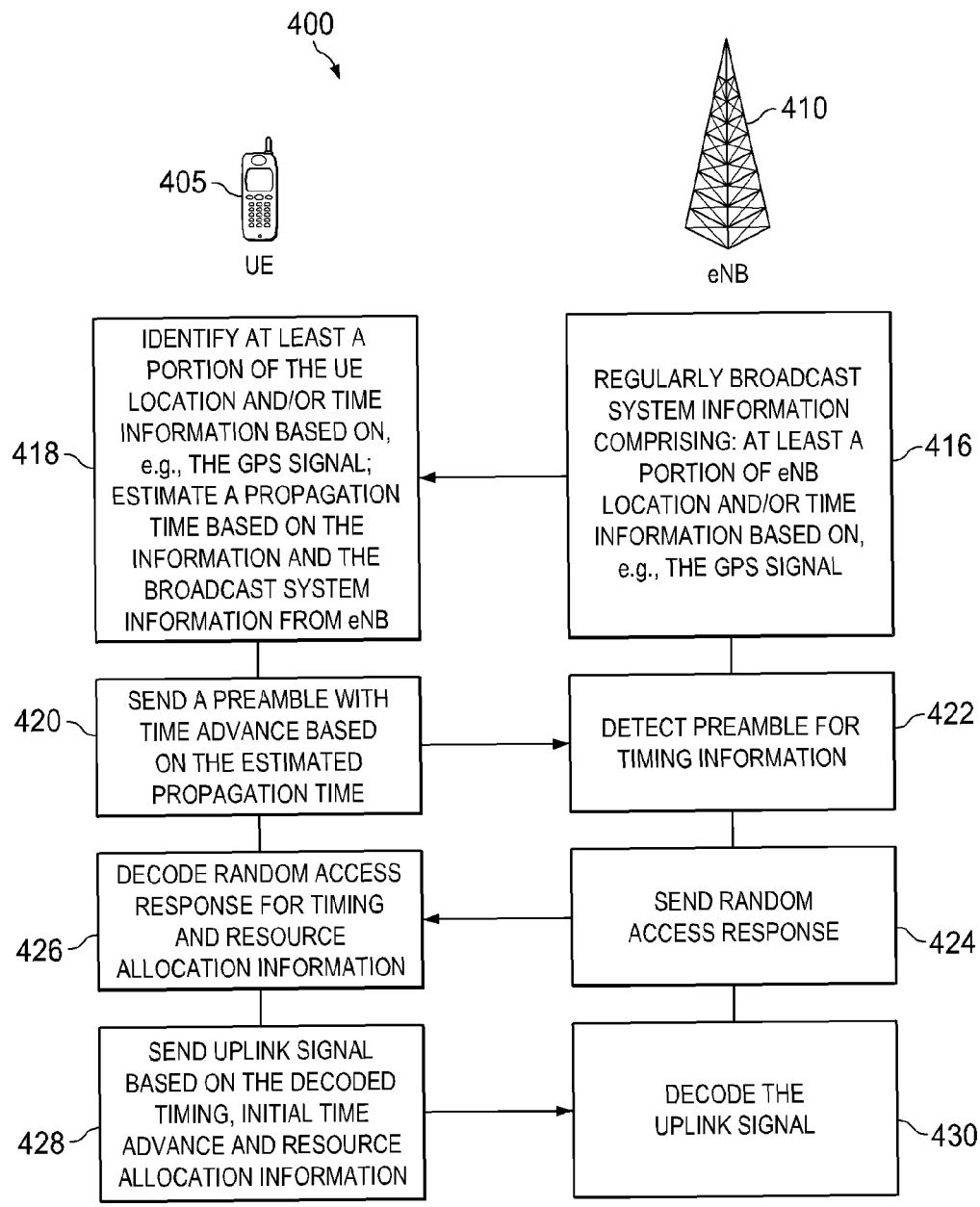
FIG. 4 is a swim lane diagram illustrating an example uplink synchronization process where a physical random access channel (PRACH) preamble is transmitted with a positive time advance to initiate a random access procedure.

FIG. 4 is a swim lane diagram illustrating an example uplink synchronization process where a PRACH preamble is transmitted with an initial positive time advance to initiate a random access procedure. The example process 400 illustrates the steps for a UE 405 to perform a random access procedure in order to become uplink-synchronized with other UEs served by the eNB 410 using some of the methods provided in the present disclosure. The example uplink synchronization process 400 may occur in any initial access scenario (including initial network access, regaining uplink synchronization with a serving eNB and/or obtaining uplink synchronization with a target eNB in handover situation) where a UE acquires an 'up-to-date' time advance value from the eNB by performing a random access procedure. As described above, the eNB 410 may be able to determine its location and/or time information based on various options, e.g., the GPS signal. The example process 400 starts at step 416, the eNB 410 can send at least a portion of its location and/or time information by explicitly including this information in the regularly broadcasted system information or implicitly aligning its transmission timing with the time information. Turning back to the UE side, at step 418 the UE 405 may determine its location and/or time information based on various options, e.g., the GPS signal. The UE may also obtain the at least a portion of eNB's 410 explicitly and/or implicitly communicated location and/or time information based on the decoded broadcast system information or other aspects of the eNB's downlink signal. In certain implementations, if the GPS information includes location information, the UE may be able to identify a fully-specified GPS location (i.e., with a precise global position upon the Earth's surface) of the eNB 410 based on its own GPS location, since the UE 405 may be in close proximity with the eNB 410 (more detail is provided in the illustration of FIG. 10). The UE 405 can then estimate an approximate propagation distance for the uplink signal based on the GPS locations of the UE and the eNB 410. Accordingly, an estimated signal propagation time can be calculated and then used to derive the initial time advance. In certain implementations, if the GPS information includes time information, the UE 405 may be able to identify the full GPS time of the eNB 410 based on its own GPS time (more detail is provided in the illustration of FIG. 11). The UE 405 may simply subtract the GPS time broadcasted by the eNB 410 from the GPS time at which the broadcast system information is detected at the UE 405 to obtain the estimated one-way signal propagation time. Next, the UE 405 can continue to step 420 to send a PRACH preamble with an initial time advance based on the estimated signal propagation time. In some implementations, the initial time advance used in sending the preamble is the over the air round trip delay (OTA_RTD) which is twice as long as the estimated one-way signal propagation time. The eNB 410 can detect the preamble and identify the timing information at step 422 (more detail is provided in the description of FIG. 7). At step 424, the eNB 410 sends a random access response which includes information on the uplink resource(s) to use for further information exchange as well as the timing advance to be used. If no matching random access response is received by the UE 405, the UE 405 may transmit a PRACH preamble at the next available PRACH opportunity. At step 426, the UE may decode the random access response for time advance and resource allocation information. Next, the UE 405 may proceed to step 428 where it sends an uplink data signal based on the decoded time advance plus the initial time advance previously used in the PRACH preamble transmission and resource allocation information. The eNB 410 may decode the synchronized uplink signal at step 430 to conclude uplink time synchronization.

Figure 5:
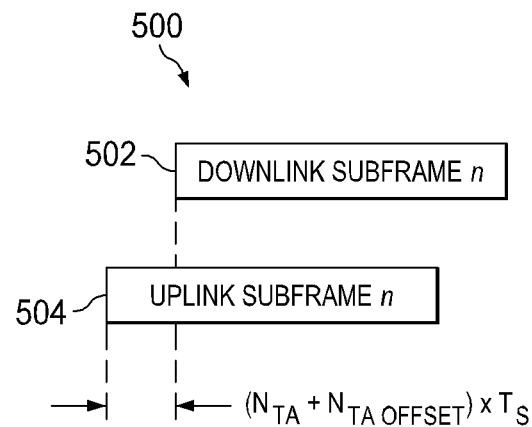
FIG. 5 is an example illustration of the uplink-downlink subframe timing relationship.

FIG. 5 is an example illustration of the uplink-downlink subframe timing relationship. In this particular example, after a successful uplink time synchronization, an uplink subframe 504 transmitted from the UE may have a timing advance of $N_{TA}+N_{TA\ offset}$ time units (each time unit measures $T_S=1/(15000\times2048)$ seconds in length) relative to the boundary of the corresponding downlink subframe 502 as received at the UE. The $N_{TA}$ time advance value may be UE-specific since it can depend on the signal propagation time between the eNB and the UE, which may vary from different UEs based on their respective locations. In addition, if a UE experiences mobility, the timing advance may change over time. Thus, regular adjustments of $N_{TA}$ may be determined by the eNB and signaled to each of the UEs. The $N_{TA\ offset}$ may be a constant equal to 0 for frequency division duplex (FDD) (i.e., uplink signal and downlink signals are transmitted using different frequency bands) systems and 614 for half-duplex (i.e., the wireless transceiver may either transmit or receive, but not both, signals at a given time) FDD and for time division duplex (TDD) (i.e., uplink and downlink signals are transmitted using different time slots within the same frequency band) systems.

Figure 6:
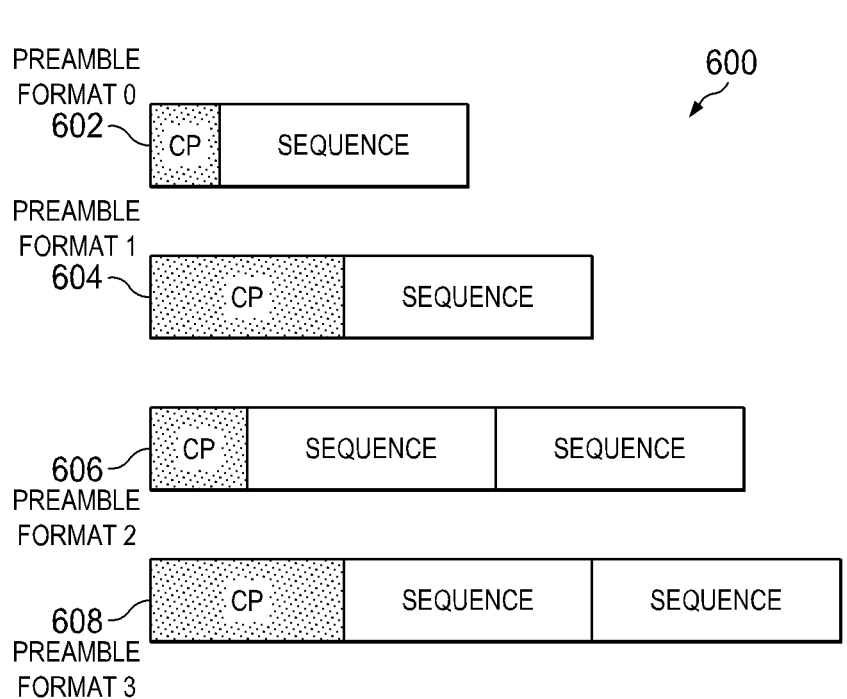
FIG. 6 is an example illustration of the frequency division duplex PRACH preamble formats.

FIG. 6 is an example illustration of the FDD PRACH preamble formats. Since the random access preamble is used by the UE when it may not have been synchronized to the uplink timing, a guard interval may be introduced to avoid collisions with other uplink signals. To avoid the interference between preambles transmitted from two UEs scheduled in adjacent time periods but possibly located at very different positions within a cell, the duration of the guard interval may be larger than the OTA_RTD, which can be about twice the length of the signal propagation time from the UE to the eNB. Further, in order to enable simple frequency-domain processing and reduce the inter-symbol interference due to channel delay spread, the preamble may use a cyclic prefix (CP). The CP can be the prefixing of a preamble with a repetition of the end portion of that same preamble. The CP can be added by copying a certain number of samples from the end of the preamble sequence and prepending these copied samples to the beginning of the preamble. As shown in example FIG. 6, in certain implementations, multiple preamble formats may be available due to the wide range of cell sizes, although only one particular preamble format may be used at any one time within a specific cell. Generally, cell size may be associated with the propagation time delay of a UE with the maximum OTA_RTD within a cell. To avoid interference between UEs located in any possible location of the cell, a longer CP may be used in a cell with larger cell radius. For example, preamble format 0 602 may be used in a small cell, format 2 606 may be used in a medium cell, and formats 1 604 and 3 608 with the longest CPs may be used in the largest cells. The inclusion of two sequences (formats 2 606 and 3 608) rather than one (formats 0 602 and 1 604) may allow more receive power to be accumulated at the eNB when the eNB searches for possible matches of preamble transmissions. Using more than one sequence within a preamble may improve the likelihood of detecting a cell-edge UE or a UE which may experience strong uplink interference. In summary, the cell size can be positively related to the CP length (which may be associated with the maximum OTA_RTD of the cell) and the number of sequences within a preamble (which may be associated with the preamble detection probability at the eNB). For some implementations, the durations of the CP, preamble sequence(s), preamble and the corresponding example time interval allocated for various PRACH preamble formats are illustrated in Table 1:

identified elements without departing from the scope of the disclosure. In example table 1, line id1 shows the CP durations in units of the system sample period, $T_S$ ($T_S$=1/(2048×15000)) seconds, for different preamble formats. The term TS36.211 stands for 3GPP LTE standard Technical Specification 36.211. Line id2 shows the CP durations in milliseconds. Line id3 shows the time durations of different preamble sequence(s) in units of $T_S$. Line id4 shows the time durations of different preamble sequence(s) in milliseconds. Line id5 shows the preamble durations for different preamble formats in milliseconds. Line id6 shows the allocated time interval in milliseconds. Line id7 shows time margins for maximum OTA_RTD (maxRTD) of a cell for different preamble formats in milliseconds, where the time margin equals the minimum of the CP time duration and the allocated time interval subtracting the preamble duration. Line id 8 shows the maximum cell radius which can be supported by different preamble formats. The maximum cell radius can be calculated as half of the time margin multiplied by the speed of light.

The preamble format and the frame and subframe number(s) to use for PRACH transmissions within a given cell may be defined by preamble configurations. The preamble configurations may be defined on a per cell basis and hence can be applied to all UEs in a particular cell. As an example, for FDD, the PRACH configuration is defined in Table 5.7.1-2 of TS36.211 and reproduced below as Table 2. For a given PRACH configuration index provided within the system information for a given cell, Table 2 provides the preamble format and times (given as frame number and

TABLE 1

Preamble Durations for PRACH Transmission

| ID | Name | Format 0 | Format 1 | Format 2 | Format 3 | Notes |
|---|---|---|---|---|---|---|
| id1 | TCP (Ts) | 3168 | 21024 | 6240 | 21024 | TS36.211 |
| id2 | Tcp duration (ms) | 0.10 | 0.68 | 0.20 | 0.68 | = Tcp * Ts * 1e3<br>Ts = 1/(2048 × 15000) seconds |
| id3 | TSEQ (Ts) | 24576 | 24576 | 49152 | 49152 | TS36.211 |
| id4 | TSEQ duration (ms) | 0.80 | 0.80 | 1.60 | 1.60 | = TSEQ * Ts * 1e3<br>Ts = 1/(2048 × 15000) second |
| id5 | Preamble Duration (ms) | 0.90 | 1.48 | 1.80 | 2.28 | = Tcp + TSEQ |
| id6 | Allocated Time Interval (ms) | 1 | 2 | 2 | 3 | TS36.211 |
| id7 | Time Margin for maxRTD (ms) | 0.10 | 0.52 | 0.20 | 0.68 | = min (Tcp, id6 − id5) |
| id8 | Maximum Cell Radius (km) | 14.53 | 77.34 | 29.53 | 102.66 | = 0.5 * Time Margin * 3E8 m/second |

The above table is for illustration purposes only and the PRACH preamble format may use some, none, or all of the identified elements subframe number combinations) at which PRACH transmission opportunities occur.

TABLE 2

Random Access Configuration for Preamble Formats 0 to 3 in FDD

| PRACH Configuration Index | Preamble Format | System frame number | Subframe number | PRACH Configuration Index | Preamble Format | System frame number | Subframe number |
|---|---|---|---|---|---|---|---|
| 0 | 0 | Even | 1 | 32 | 2 | Even | 1 |
| 1 | 0 | Even | 4 | 33 | 2 | Even | 4 |
| 2 | 0 | Even | 7 | 34 | 2 | Even | 7 |
| 3 | 0 | Any | 1 | 35 | 2 | Any | 1 |
| 4 | 0 | Any | 4 | 36 | 2 | Any | 4 |
| 5 | 0 | Any | 7 | 37 | 2 | Any | 7 |

TABLE 2-continued

Random Access Configuration for Preamble Formats 0 to 3 in FDD

| PRACH Configuration Index | Preamble Format | System frame number | Subframe number | PRACH Configuration Index | Preamble Format | System frame number | Subframe number |
|---|---|---|---|---|---|---|---|
| 6 | 0 | Any | 1, 6 | 38 | 2 | Any | 1, 6 |
| 7 | 0 | Any | 2, 7 | 39 | 2 | Any | 2, 7 |
| 8 | 0 | Any | 3, 8 | 40 | 2 | Any | 3, 8 |
| 9 | 0 | Any | 1, 4, 7 | 41 | 2 | Any | 1, 4, 7 |
| 10 | 0 | Any | 2, 5, 8 | 42 | 2 | Any | 2, 5, 8 |
| 11 | 0 | Any | 3, 6, 9 | 43 | 2 | Any | 3, 6, 9 |
| 12 | 0 | Any | 0, 2, 4, 6, 8 | 44 | 2 | Any | 0, 2, 4, 6, 8 |
| 13 | 0 | Any | 1, 3, 5, 7, 9 | 45 | 2 | Any | 1, 3, 5, 7, 9 |
| 14 | 0 | Any | 0, 1, 2, 3, 4, 5, 6, 7, 8, 9 | 46 | N/A | N/A | N/A |
| 15 | 0 | Even | 9 | 47 | 2 | Even | 9 |
| 16 | 1 | Even | 1 | 48 | 3 | Even | 1 |
| 17 | 1 | Even | 4 | 49 | 3 | Even | 4 |
| 18 | 1 | Even | 7 | 50 | 3 | Even | 7 |
| 19 | 1 | Any | 1 | 51 | 3 | Any | 1 |
| 20 | 1 | Any | 4 | 52 | 3 | Any | 4 |
| 21 | 1 | Any | 7 | 53 | 3 | Any | 7 |
| 22 | 1 | Any | 1, 6 | 54 | 3 | Any | 1, 6 |
| 23 | 1 | Any | 2, 7 | 55 | 3 | Any | 2, 7 |
| 24 | 1 | Any | 3, 8 | 56 | 3 | Any | 3, 8 |
| 25 | 1 | Any | 1, 4, 7 | 57 | 3 | Any | 1, 4, 7 |
| 26 | 1 | Any | 2, 5, 8 | 58 | 3 | Any | 2, 5, 8 |
| 27 | 1 | Any | 3, 6, 9 | 59 | 3 | Any | 3, 6, 9 |
| 28 | 1 | Any | 0, 2, 4, 6, 8 | 60 | N/A | N/A | N/A |
| 29 | 1 | Any | 1, 3, 5, 7, 9 | 61 | N/A | N/A | N/A |
| 30 | N/A | N/A | N/A | 62 | N/A | N/A | N/A |
| 31 | 1 | Even | 9 | 63 | 3 | Even | 9 |

The preamble sequence may be a binary orthogonal sequence such that the eNB can identify different preambles transmitted from different UEs using non-coherent detection to detect the correlation peaks. Orthogonal sequences have the property that a set of sequences generated from a root sequence are orthogonal between each other, i.e., any two sequences within the set of orthogonal sequences have zero cross correlation between each other. In a particular implementation specified in TS36.211, preamble sequences are generated from one or more Zadoff-Chu (ZC) sequences. A relevant extract of procedural text from TS36.211 on the preamble sequence generation is "There are 64 preambles available in each cell. The set of 64 preamble sequences in a cell is found by including first, in the order of increasing cyclic shift, all the available cyclic shifts of a root Zadoff-Chu sequence with the logical index RACH_ROOT_SEQUENCE, where RACH_ROOT_SEQUENCE is broadcasted as part of the System Information. Additional preamble sequences, in case 64 preambles cannot be generated from a single root Zadoff-Chu sequence, are obtained from the root sequences with the consecutive logical indexes until all the 64 sequences are found. The logical root sequence order is cyclic: the logical index 0 is consecutive to 837."

Figure 7:
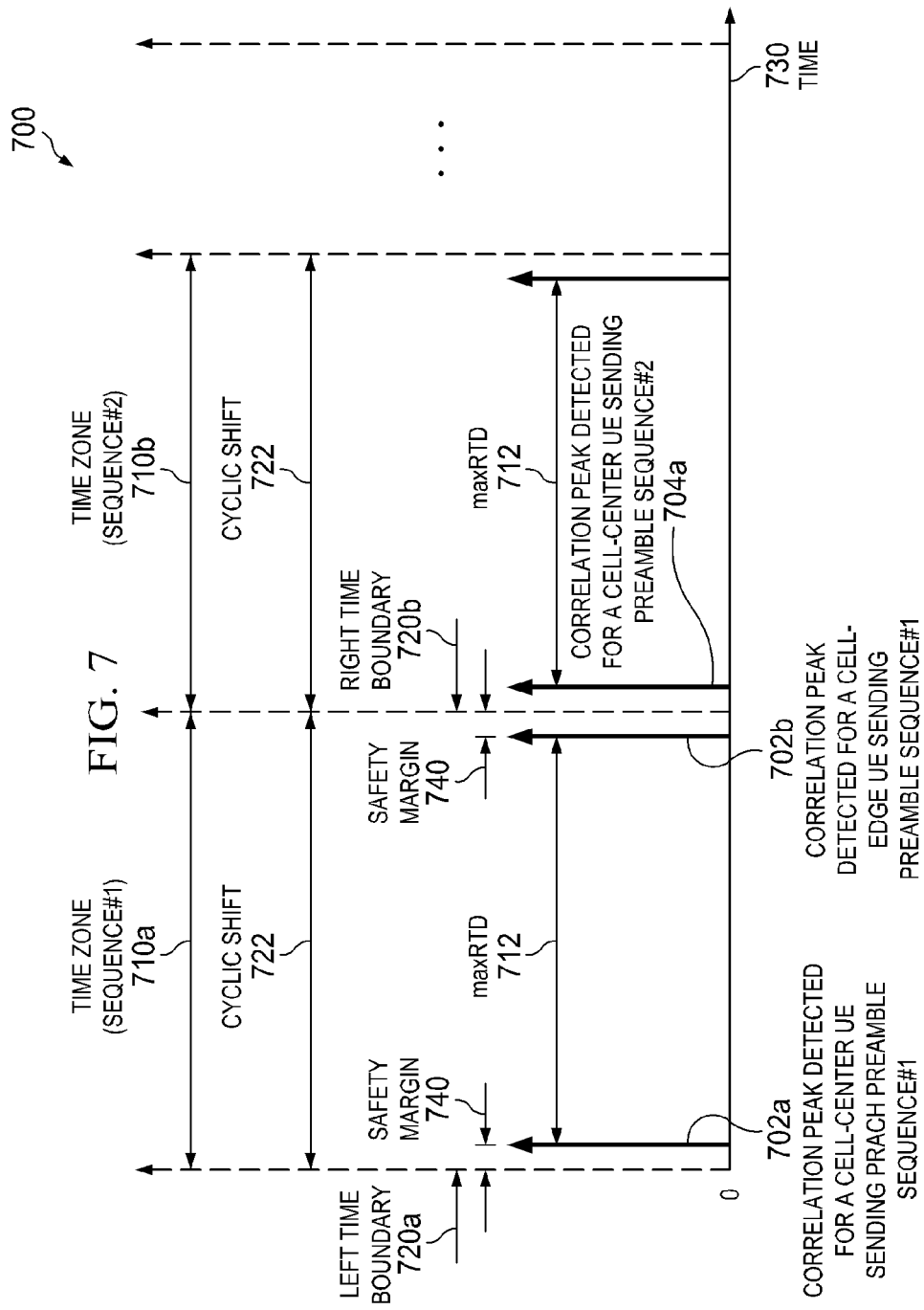
FIG. 7 is an example illustration of correlation peaks in PRACH preamble detection.

FIG. 7 is an example illustration of the correlation peaks in PRACH preamble detection at the receiver. At a high level, for a given cell, since UEs may be located anywhere in the cell, the corresponding time of arrival of their PRACH preambles at the eNB can be with an OTA_RTD ranging from OTA_RTD=0 to OTA_RTD=maxRTD. The cyclic shift may be larger than the maxRTD 712, such that the correlation peaks for different UE preambles may be distinguishable by the eNB. More specifically, for all sequences generated from the same root ZC sequence, correlation peaks may be determined in the PRACH preamble detection. The correlation peak associated with one particular preamble sequence may show within a time zone 710 corresponding to the preamble sequence. The time location of the correlation peak within the time boundaries 720 of a preamble sequence time zone 710 may depend on the RTD between the eNB and the UE which sends the preamble. If that UE is close to the eNB, the detected correlation peak 702a, as shown in example FIG. 7, may be close to the left time boundary 720a of the preamble sequence#1 time zone 710a. Otherwise, its correlation peak 702b may be far away from the left time boundary 720a. The number of time zones 710 may depend on the number of simultaneous preamble sequences from the same root sequence that the minimum cyclic shift can separate from the same root sequence. In the particular example illustrated in FIG. 7, two UEs are each performing a random access procedure for uplink time synchronization at the same time. UE#1 is a cell-edge UE which may be far away from the eNB. UE#1 sends a PRACH preamble using sequence#1; UE#2 is a cell-center UE which may be close to the eNB. UE#2 sends in the same PRACH time slot as UE#1 a PRACH preamble using sequence#2. At the eNB, the correlation peak 702b for UE#1 is in the time zone for sequence#1 710a and is close to the right time boundary. The correlation peak 704a for UE#2 is in the time zone for sequence#2 710b and is close to the left time boundary of the time zone for sequence #2 710b. In this case, the eNB may identify the number of UEs requesting random access and their corresponding sequences and round trip delays based on the time 730 location of the correlation peak. In some implementations, if two UEs use the same preamble sequence#1 to send PRACH preambles in the same PRACH time slot, their correlation peaks 702 may appear within the same time zone 710 for sequence#1. In this case, the eNB may detect two correlation peaks but may consider the multiple correlation peaks detected as part of the multipath effect on the preamble sent from one UE. This situation may occur if the UEs were using non-dedicated PRACH preambles and selected the same PRACH preamble to transmit, in which case the contention resolution portion of the random access procedure (in which the eNB decides which UE actually "wins" the random access procedure) may be triggered. The eNB can detect that a preamble transmission was performed and would hence initiate the contention resolution process. More details on handling the contention resolution process can be found in the existing 3GPP LTE Release-8 specification.

As the cyclic shift may be larger than the maxRTD, in order for the eNB to identify preambles with different sequences, the number of sequences that can be generated from the same root ZC sequence may be smaller for larger cells (which would have larger maxRTD values). In other words, more root ZC sequences may be used in order to generate the required total of 64 preamble sequences, for example, as is used by the E-UTRA standard. However, the cross correlation between sequences generated from different root ZC sequences may no longer be zero, i.e., there may be interferences introduced when detecting the correlation peaks due to the breakdown of orthogonality between different preamble sequences derived from different root ZC sequences. In addition, a larger number of root ZC sequences may result in increased correlation processing at the eNB (in contrast to an eNB which can use one correlation processing procedure to detect the correlation peaks of all or substantially all preamble sequences generated from one root ZC sequence) and the complexity of PRACH preamble detection may increase. The potential interferences from different root ZC sequences may affect the PRACH preamble detection performance when there are two or more preambles derived from different root ZC sequences arriving at an eNB for detection at the same time. Failed PRACH detection at the eNB may trigger PRACH retransmissions, which may also result in a larger total power usage for the UE preamble transmission.

In some implementations, a UE may be able to obtain position and/or time information of itself and the eNB it intends to access. For example, a UE equipped with a GPS device (e.g., GPS receiver) may identify its GPS location and/or time information based on the received GPS signals. The UE may also identify at least a portion of the GPS location and/or time information of the eNB if the eNB transmits the at least a portion of its GPS location and/or time. For example, the eNB may broadcast either one or both of the GPS location and GPS time as system information (e.g., in system information block 2 (SIB2)). In some implementations, broadcasting the GPS information may use one or more additional information elements within a system information block.

If the information broadcasted by the eNB includes the GPS time at the moment the information is broadcasted, the UE can measure the GPS time at which the broadcasted information is received. Accordingly, the UE can estimate the one-way signal propagation time from the eNB to the UE. If the information broadcasted by the eNB includes the GPS location of the eNB, the UE can estimate the corresponding OTA_RTD between itself and the eNB, and can use that estimated OTA_RTD minus a safety margin 740 as the initial time-advance to send the PRACH preamble. The safety margin 740 can be a positive number to account for at least the following three factors. The first factor that the safety margin 740 may be used to account for is the estimation error in OTA_RTD. The estimation error in OTA_RTD may result from the inaccuracy of GPS information. Note that a moderately large GPS location estimation error may result in only a small inaccuracy in GPS time. For example, a 150-meter GPS accuracy error may correspond to only a 1 microsecond error in round trip delay. The second factor that the safety margin may be used to account for is the estimation error of the UE downlink timing. The third factor that the safety margin may be used to account for is the estimation for the timing error due to possible digress of the propagation path from line-of-sight. Using GPS location information to estimate the OTA_RTD is equivalent to assuming that the OTA_RTD is proportional to the line-of-sight distance between the UE and the eNB. However, as mentioned in the above description, the actual propagation path of the signal may not be the line-of-sight between the UE and the eNB and a safety margin can be used to compensate for the timing error.

If all UEs in a cell estimate their respective OTA_RTD correctly and use their respective OTA_RTD to transmit their PRACH preamble, their PRACH preambles may arrive at almost the same time at the eNB. Accordingly, in some implementations, the cyclic shift may be reduced so that one root ZC sequence can be sufficient to generate the 64 preamble sequences. An example comparison of parameters including the minimum cyclic shift and the number of root sequences (to support 64 preambles) for different example preamble formats with and without a UE-generated initial time advance is provided in Table 3.

TABLE 3

Comparison of Example Preamble Formats with Different Time Advances

| id | Name | preamble format#0 (no time advance) | preamble format#1 (no time advance) | Time advanced preamble | notes |
|---|---|---|---|---|---|
| id1 | cell radius (km) | 15 | 30 | 30 | |
| id2 | minimum cyclic shift (ms) | 0.1 (100 µs) | 0.2 (200 µs) | 0.0125 (12.5 µs) | Preamble format#0.1 (no time advance) id2 = id1 * 1e3/3e8 * 1e3 * 2 where 3e8: speed of light. *2: round trip Time advance preamble: |

TABLE 3-continued

Comparison of Example Preamble Formats with Different Time Advances

| id | Name | preamble format#0 (no time advance) | preamble format#1 (no time advance) | Time advanced preamble | notes |
|---|---|---|---|---|---|
| | | | | | 12.5us = 1 µs + 1 µs + 5 µs + 5.5 µs where 1 µs: GPS accuracy in RTD estimate. 1 µs: Downlink timing estimate accuracy. 5 µs: Channel delay profile. 5.5 µs: additional margin. |
| id3 | preamble duration (ms) | 0.8 | 0.8 | 0.8 | by PRACH definition |
| id4 | number of preambles per root sequence | 8 | 4 | 64 | id4 = id3/id2 |
| id5 | number of preambles to be supported | 64 | 64 | 64 | requirement |
| id6 | number of root sequences | 8 | 16 | 1 | |

As is shown in Table 3 under the notes column, the minimum cyclic shift of a preamble transmitted with a non-zero initial time advance may be 12.5 µs, which is equivalent to the maximum OTA_RTD of a cell radius of 1.875 km. Further, one root ZC sequence may support a total of 64 preambles. In other words, a time-advanced PRACH preamble may be used in a cell with larger radius while using a smaller minimum cyclic shift and smaller number of source root ZC sequences. Note that the above table is for illustration purposes only. The preamble may have other formats and/or time advances transmitted using some, none, or all of the disclosed methods without departing from the scope of the disclosure.

Similarly, if all UEs can correctly estimate their respective OTA_RTD and transmit their PRACH preambles using an initial time advance derived from their respective OTA_RTD, a PRACH preamble format with a small CP portion may be used for the initial access regardless of the cell radius, since a PRACH preamble format with a CP shorter than the cell's maxRTD may be configured in this scenario. For example, for the set of preamble formats shown in FIG. 6, preamble format 0 may be used instead of preamble format 2. Preamble format 0 includes one CP portion followed by one preamble sequence while preamble format 2 includes one CP portion (which is longer than the CP portion for preamble format 0) followed by two preamble sequences. The latter preamble format may provide extra transmit power to combat a potentially large path-loss and may be useful in a large cell for a cell-edge UE to access the system since the eNB may be able to detect a format 2 preamble more easily than a format 0 preamble in such a situation. Thus, in some implementations, with a time-advanced preamble transmission, cell-center UEs may choose preamble format 0 and cell-edge UEs may choose preamble format 2 so that the UE transmit power may be further conserved for cell-center UEs. In some implementations, a more power efficient transmission from a UE's point of view may be to transmit a higher power over a shorter time in order to reduce overall power consumption. In some implementations, the eNB which an UE intends to access can configure one shared physical resource for the two preamble formats or configure a different physical resource for each of the two preamble formats. The eNB may also budget less frequent physical resources for the PRACH preamble format with a larger CP portion. Furthermore, the eNB may configure the cyclic shift used to separate preamble sequences to a smaller value (to cover the possible OTA_RTD estimation error at UEs plus a safety time margin) such that a smaller number of root ZC sequences may be used and potentially less PRACH interference may occur should multiple UEs transmit PRACH preambles derived from different root ZC sequences in the same PRACH physical resources allocated by the eNB.

Figure 8A:
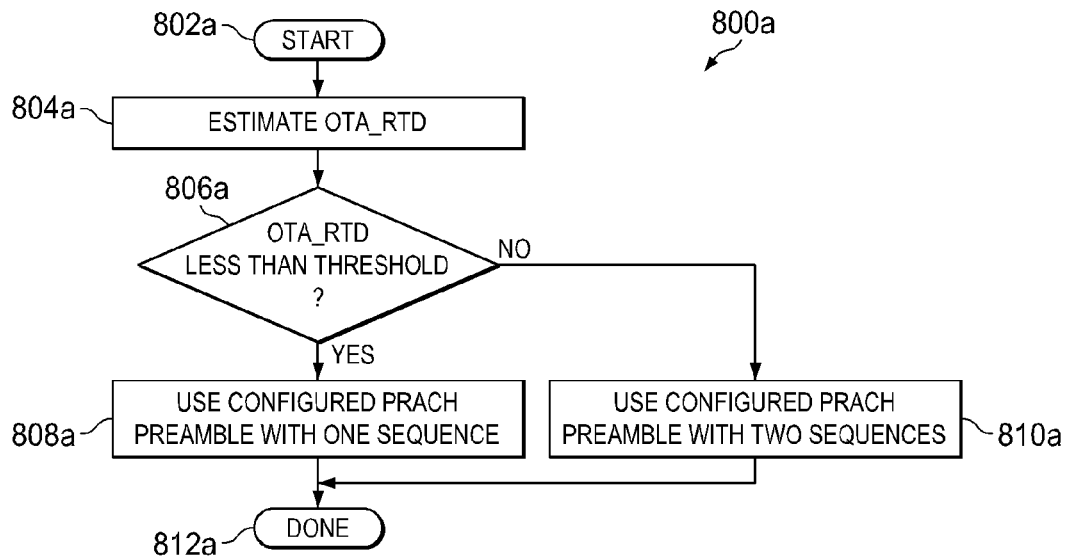
FIGS. 8A-B are flowcharts illustrating the selection of PRACH preamble format at the UE and the eNB respectively.
Figure 8B:
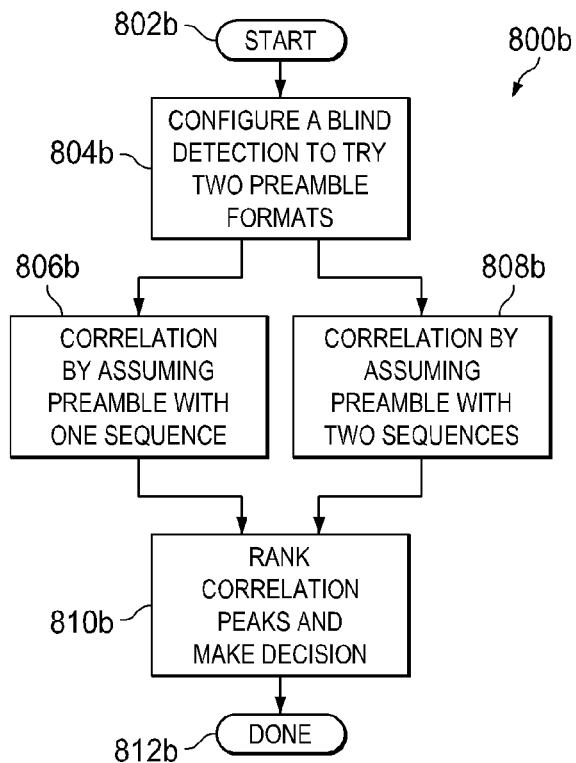

FIGS. 8A-B are flowcharts illustrating the selection of PRACH preamble format at a UE and an eNB respectively. The example preamble format selection at the UE 800a starts at step 802a. The UE can estimate an OTA_RTD at step 804a. Next, at decisional step 806a, the estimated OTA_RTD may be compared with a configured threshold. The OTA_RTD can be associated with the distance between the UE and the eNB. As discussed in the above description, two consecutive preamble sequences may increase the strength of a correlation peak detected at the eNB. Therefore, if the estimated OTA_RTD is less than the threshold, the UE may continue to step 808a where it uses a configured PRACH preamble format with one preamble sequence. Otherwise, the UE may continue to step 810a where it uses a configured PRACH preamble format with two preamble sequences. The process 800a ends at step 812a.

A suitable threshold may be included in the system information broadcasted by the eNB. In some applications, the threshold may be included in the PRACH-ConfigSIB information element. The PRACH-ConfigSIB information element may further be included in the RadioResourceConfigCommonSIB. An illustration of an example RadioResourceConfigCommonSIB configuration is provided in FIG. 9.

In addition to or in place of comparing the estimated OTA_RTD to a configured threshold, the UE may also estimate a received signal strength from the eNB. This estimated received signal strength may then be compared to a configured threshold to assist the UE in deciding which one of multiple configured PRACH preamble formats to select.

Turning to the eNB side, the preamble format selection process at the eNB 800*b* starts at step 802*b*. At step 804*b*, the eNB can configure a blind detection without any prior knowledge on the PRACH preamble format selected by the UE to try two different preamble formats. The eNB may continue to step 806*b* to search for a correlation peak by assuming a preamble format with one preamble sequence was used by the UE. In the meanwhile, the eNB may also search for a correlation peak by assuming a preamble with two preamble sequences was used by the UE. Next, at step 810*b*, the eNB may rank any correlation peaks identified at steps 806*b* and 808*b* and make the decision on which preamble format, if any, was used by the UE. The process 800*b* ends at step 812*b*.

In some implementations, no position and/or time information of the UE and/or the eNB is available or the available position and/or time information is insufficient to estimate a satisfactory signal propagation time. In such cases, the UE may send the PRACH preamble using the conventional approach, i.e., with zero time advance, for random access.

In some implementations, a dual PRACH configuration which can adapt to both conventional PRACH preamble transmission and time-advanced PRACH preamble transmission may be used. For example, an eNB may configure a portion of physical resources for transmission of conventional PRACH preambles. This configuration can maintain backward compatibility with earlier release UEs which may not yet have time-advanced preamble transmission enabled. Correspondingly, an eNB may also configure a portion of the uplink physical resources for transmission of time-advanced PRACH preambles.

In some implementations, using the dual PRACH configuration mentioned above may lead to a saving in the total uplink resources allocated to preamble transmission. The following table provides percentages of total uplink transmission resources that may be allocated for PRACH transmission resources as a function of the PRACH configuration index (which can determine the PRACH preamble format and the frames/subframes in which PRACH preambles may be transmitted) and the uplink system bandwidth. The maximum delay that a UE might encounter before being able to initiate a PRACH preamble transmission is also given in the tables (the maximum delay is correlated to the frames/subframes in which PRACH preambles may be transmitted). The number of resource blocks that may be allocated for PRACH resources are measured in the frequency dimension (for an FDD system) and is correlated to the preamble format and number of PRACH transmission opportunities in the time dimension. Note that the PRACH configuration and/or uplink resource utilization shown in the following table is for the conventional PRACH preamble with zero time advance.

TABLE 4

PRACH Uplink Resource Utilization

| PRACH config index | Preamble format | System Frame Number | Subframe number(s) | Max delay for PRACH resource | 1.4 MHz | 3 MHz | 5 MHz | 10 MHz | 15 MHz | 20 MHz |
|---|---|---|---|---|---|---|---|---|---|---|
| 0 | 0 | Even | 1 | 20 ms | 5.0% | 2.0% | 1.2% | 0.6% | 0.4% | 0.3% |
| 1 | 0 | Even | 4 | 20 ms | 5.0% | 2.0% | 1.2% | 0.6% | 0.4% | 0.3% |
| 2 | 0 | Even | 7 | 20 ms | 5.0% | 2.0% | 1.2% | 0.6% | 0.4% | 0.3% |
| 3 | 0 | Any | 1 | 10 ms | 10.0% | 4.0% | 2.4% | 1.2% | 0.8% | 0.6% |
| 4 | 0 | Any | 4 | 10 ms | 10.0% | 4.0% | 2.4% | 1.2% | 0.8% | 0.6% |
| 5 | 0 | Any | 7 | 10 ms | 10.0% | 4.0% | 2.4% | 1.2% | 0.8% | 0.6% |
| 6 | 0 | Any | 1, 6 | 5 ms | 20.0% | 8.0% | 4.8% | 2.4% | 1.6% | 1.2% |
| 7 | 0 | Any | 2, 7 | 5 ms | 20.0% | 8.0% | 4.8% | 2.4% | 1.6% | 1.2% |
| 8 | 0 | Any | 3, 8 | 5 ms | 20.0% | 8.0% | 4.8% | 2.4% | 1.6% | 1.2% |
| 9 | 0 | Any | 1, 4, 7 | 4 ms | 30.0% | 12.0% | 7.2% | 3.6% | 2.4% | 1.8% |
| 10 | 0 | Any | 2, 5, 8 | 4 ms | 30.0% | 12.0% | 7.2% | 3.6% | 2.4% | 1.8% |
| 11 | 0 | Any | 3, 6, 9 | 4 ms | 30.0% | 12.0% | 7.2% | 3.6% | 2.4% | 1.8% |
| 12 | 0 | Any | 0, 2, 4, 6, 8 | 2 ms | 50.0% | 20.0% | 12.0% | 6.0% | 4.0% | 3.0% |
| 13 | 0 | Any | 1, 3, 5, 6, 9 | 2 ms | 50.0% | 20.0% | 12.0% | 6.0% | 4.0% | 3.0% |
| 14 | 0 | Any | 0, 1, 2, 3, 4, 5, 6, 7, 8, 9 | 1 ms | 100.0% | 40.0% | 24.0% | 12.0% | 8.0% | 6.0% |
| 15 | 0 | Even | 9 | 20 ms | 5.0% | 2.0% | 1.2% | 0.6% | 0.4% | 0.3% |
| 16 | 1 | Even | 1 | 20 ms | 10.0% | 4.0% | 2.4% | 1.2% | 0.8% | 0.6% |
| 17 | 1 | Even | 4 | 20 ms | 10.0% | 4.0% | 2.4% | 1.2% | 0.8% | 0.6% |
| 18 | 1 | Even | 7 | 20 ms | 10.0% | 4.0% | 2.4% | 1.2% | 0.8% | 0.6% |
| 19 | 1 | Any | 1 | 10 ms | 20.0% | 8.0% | 4.8% | 2.4% | 1.6% | 1.2% |
| 20 | 1 | Any | 4 | 10 ms | 20.0% | 8.0% | 4.8% | 2.4% | 1.6% | 1.2% |
| 21 | 1 | Any | 7 | 10 ms | 20.0% | 8.0% | 4.8% | 2.4% | 1.6% | 1.2% |
| 22 | 1 | Any | 1, 6 | 5 ms | 40.0% | 16.0% | 9.6% | 4.8% | 3.2% | 2.4% |
| 23 | 1 | Any | 2, 7 | 5 ms | 40.0% | 16.0% | 9.6% | 4.8% | 3.2% | 2.4% |
| 24 | 1 | Any | 3, 8 | 5 ms | 40.0% | 16.0% | 9.6% | 4.8% | 3.2% | 2.4% |
| 25 | 1 | Any | 1, 4, 7 | 4 ms | 60.0% | 24.0% | 14.4% | 7.2% | 4.8% | 3.6% |
| 26 | 1 | Any | 2, 5, 8 | 4 ms | 60.0% | 24.0% | 14.4% | 7.2% | 4.8% | 3.6% |
| 27 | 1 | Any | 3, 6, 9 | 4 ms | 60.0% | 24.0% | 14.4% | 7.2% | 4.8% | 3.6% |
| 28 | 1 | Any | 0, 2, 4, 6, 8 | 2 ms | 100.0% | 40.0% | 24.0% | 12.0% | 8.0% | 6.0% |
| 29 | 1 | Any | 1, 3, 5, 6, 9 | 2 ms | 100.0% | 40.0% | 24.0% | 12.0% | 8.0% | 6.0% |
| 30 | n/a | n/a | n/a | n/a | n/a | n/a | n/a | n/a | n/a | n/a |
| 31 | 1 | Even | 9 | 20 ms | 10.0% | 4.0% | 2.4% | 1.2% | 0.8% | 0.6% |
| 32 | 2 | Even | 1 | 20 ms | 10.0% | 4.0% | 2.4% | 1.2% | 0.8% | 0.6% |
| 33 | 2 | Even | 4 | 20 ms | 10.0% | 4.0% | 2.4% | 1.2% | 0.8% | 0.6% |
| 34 | 2 | Even | 7 | 20 ms | 10.0% | 4.0% | 2.4% | 1.2% | 0.8% | 0.6% |

TABLE 4-continued

PRACH Uplink Resource Utilization

| PRACH config index | Preamble format | System Frame Number | Subframe number(s) | Max delay for PRACH resource | 1.4 MHz | 3 MHz | 5 MHz | 10 MHz | 15 MHz | 20 MHz |
|---|---|---|---|---|---|---|---|---|---|---|
| 35 | 2 | Any | 1 | 10 ms | 20.0% | 8.0% | 4.8% | 2.4% | 1.6% | 1.2% |
| 36 | 2 | Any | 4 | 10 ms | 20.0% | 8.0% | 4.8% | 2.4% | 1.6% | 1.2% |
| 37 | 2 | Any | 7 | 10 ms | 20.0% | 8.0% | 4.8% | 2.4% | 1.6% | 1.2% |
| 38 | 2 | Any | 1, 6 | 5 ms | 40.0% | 16.0% | 9.6% | 4.8% | 3.2% | 2.4% |
| 39 | 2 | Any | 2, 7 | 5 ms | 40.0% | 16.0% | 9.6% | 4.8% | 3.2% | 2.4% |
| 40 | 2 | Any | 3, 8 | 5 ms | 40.0% | 16.0% | 9.6% | 4.8% | 3.2% | 2.4% |
| 41 | 2 | Any | 1, 4, 7 | 4 ms | 60.0% | 24.0% | 14.4% | 7.2% | 4.8% | 3.6% |
| 42 | 2 | Any | 2, 5, 8 | 4 ms | 60.0% | 24.0% | 14.4% | 7.2% | 4.8% | 3.6% |
| 43 | 2 | Any | 3, 6, 9 | 4 ms | 60.0% | 24.0% | 14.4% | 7.2% | 4.8% | 3.6% |
| 44 | 2 | Any | 0, 2, 4, 6, 8 | 2 ms | 100.0% | 40.0% | 24.0% | 12.0% | 8.0% | 6.0% |
| 45 | 2 | Any | 1, 3, 5, 6, 9 | 2 ms | 100.0% | 40.0% | 24.0% | 12.0% | 8.0% | 6.0% |
| 46 | n/a | n/a | n/a | n/a | n/a | n/a | n/a | n/a | n/a | n/a |
| 47 | 2 | Even | 9 | 20 ms | 10.0% | 4.0% | 2.4% | 1.2% | 0.8% | 0.6% |
| 48 | 3 | Even | 1 | 20 ms | 15.0% | 6.0% | 3.6% | 1.8% | 1.2% | 0.9% |
| 49 | 3 | Even | 4 | 20 ms | 15.0% | 6.0% | 3.6% | 1.8% | 1.2% | 0.9% |
| 50 | 3 | Even | 7 | 20 ms | 15.0% | 6.0% | 3.6% | 1.8% | 1.2% | 0.9% |
| 51 | 3 | Any | 1 | 10 ms | 30.0% | 12.0% | 7.2% | 3.6% | 2.4% | 1.8% |
| 52 | 3 | Any | 4 | 10 ms | 30.0% | 12.0% | 7.2% | 3.6% | 2.4% | 1.8% |
| 53 | 3 | Any | 7 | 10 ms | 30.0% | 12.0% | 7.2% | 3.6% | 2.4% | 1.8% |
| 54 | 3 | Any | 1, 6 | 5 ms | 60.0% | 24.0% | 14.4% | 7.2% | 4.8% | 3.6% |
| 55 | 3 | Any | 2, 7 | 5 ms | 60.0% | 24.0% | 14.4% | 7.2% | 4.8% | 3.6% |
| 56 | 3 | Any | 3, 8 | 5 ms | 60.0% | 24.0% | 14.4% | 7.2% | 4.8% | 3.6% |
| 57 | 3 | Any | 1, 4, 7 | 4 ms | 90.0% | 36.0% | 21.6% | 10.8% | 7.2% | 5.4% |
| 58 | 3 | Any | 2, 5, 8 | 4 ms | 90.0% | 36.0% | 21.6% | 10.8% | 7.2% | 5.4% |
| 59 | 3 | Any | 3, 6, 9 | 4 ms | 90.0% | 36.0% | 21.6% | 10.8% | 7.2% | 5.4% |
| 60 | n/a | n/a | n/a | n/a | n/a | n/a | n/a | n/a | n/a | n/a |
| 61 | n/a | n/a | n/a | n/a | n/a | n/a | n/a | n/a | n/a | n/a |
| 62 | n/a | n/a | n/a | n/a | n/a | n/a | n/a | n/a | n/a | n/a |
| 63 | 3 | Even | 9 | 20 ms | 15.0% | 6.0% | 3.6% | 1.8% | 1.2% | 0.9% |

An example comparison of different PRACH allocations can be provided as follows. Consider the case where an uplink channel may have a 10 MHz bandwidth. As shown in the above table, for the conventional PRACH configuration, preamble format 1 and a maximum PRACH delay of 4 ms (before the UE can access a PRACH transmission opportunity) corresponds to the configuration index 25 (subframes 1, 4 and 7 in all frames). By using the PRACH configuration index 25 to define PRACH resources, the percentage of total uplink resources allocated for PRACH can be 7.2%. Now consider a dual PRACH configuration which also has a maximum PRACH delay of 4 ms for UEs using a time-advanced PRACH preamble. This may correspond to PRACH configuration indices including, for example, (1) PRACH configuration index 31 for UEs using a conventional preamble (PRACH format 1, subframe 9 in even frames); and (2) PRACH configuration index 9 for UEs using a time-advanced preamble (PRACH format 0, subframes 1, 4 and 7 in all frames). Thus, for the dual PRACH configuration, the percentage of total uplink resources allocated for PRACH may be calculated as 1.2%+3.6%=4.8%. In this particular example comparison, the uplink resources allocated to the PRACH have been reduced by ⅓ by using the time-advanced preamble. In other words, an additional 2.4% of total uplink resources may be saved for the non-PRACH transmission use such as for carrying data traffic.

Similarly, the dual PRACH resource configuration may be broadcasted as system information by the eNB using the example RadioResourceConfigCommonSIB information element as illustrated in FIG. 9. Turning back to FIG. 9, in some implementations, possible changes to the information element may be illustrated as follows. The eNB may define different random access channel (RACH) parameters and PRACH configurations, depending on whether a UE uses the conventional PRACH preamble transmission procedure (i.e. an initial timing advance of 0) or the time-advanced PRACH preamble transmission procedure (i.e. a UE estimated positive timing advance). The existing rash-Config-Common and prach-Config information elements may be used by 3GPP LTE Release-8 UEs and other UEs that transmit a conventional PRACH preamble. The rash-ConfigCommonUeTA and prach-ConfigUeTA information elements may be used by UEs that transmit a time-advanced PRACH preamble. For example, the prach-ConfigUeTA information element may contain the PRACH configuration index to be used by UEs with time-advanced PRACH preamble, and this PRACH configuration index may be different from the PRACH configuration index contained in the existing prach-Config information element. Full definitions of the RACH-ConfigCommon and PRACH-ConfigSIB information element formats can be found in Section 6.3.2 of 3GPP LTE standard TS 36.331.

Now turn to the estimation of signal propagation time based on position and/or time information. In some implementations, GPS signals may be used to identify the position and/or time of the UE and/or the eNB. FIG. 10 is a flowchart illustrating the estimation of signal propagation distance at the UE based on the partial GPS location information broadcasted by the eNB. In this particular example, the distance estimation process 1000 starts at step 1002. At step 1004, a UE which has been equipped with a GPS receiver may identify its fully-specified (i.e. with a precise global position upon the Earth's surface) GPS location information using the GPS signals received. At step 1006, at least a portion of eNB location information may be included in the broadcasted system information which is then obtained by the UE. Note that in some implementations, a fully-specified GPS location may not be necessary. For example, the UE can assume that the eNB is within a certain maximum distance away (e.g. 100 km), since any distance beyond that may result in the UE not being able to receive the eNB's signals. Accordingly, the eNB may not include the coarser details of its GPS location (e.g. degrees of longitude and latitude). Instead, the eNB may broadcast the finer portion of its GPS location. At step 1008, the UE may be able to "fill in" the missing portion of the eNB's GPS location by using the UE's fully-specified GPS location determined at step 1004, and then infer the fully-specified GPS location of the eNB. The inferred fully-specified GPS location of the eNB may provide information for the UE to calculate the distance between the UE and eNB. Further, broadcasting partial GPS location information may reduce the number of information bits that use the system resource. Next, at step 1010, the UE can estimate the line-of-sight propagation distance between the eNB and UE using their respective fully-specified GPS locations. Therefore, an estimated one-way signal propagation time can be determined by simply dividing the propagation distance by the speed of light. The process 1000 ends at step 1012.

Figure 11:
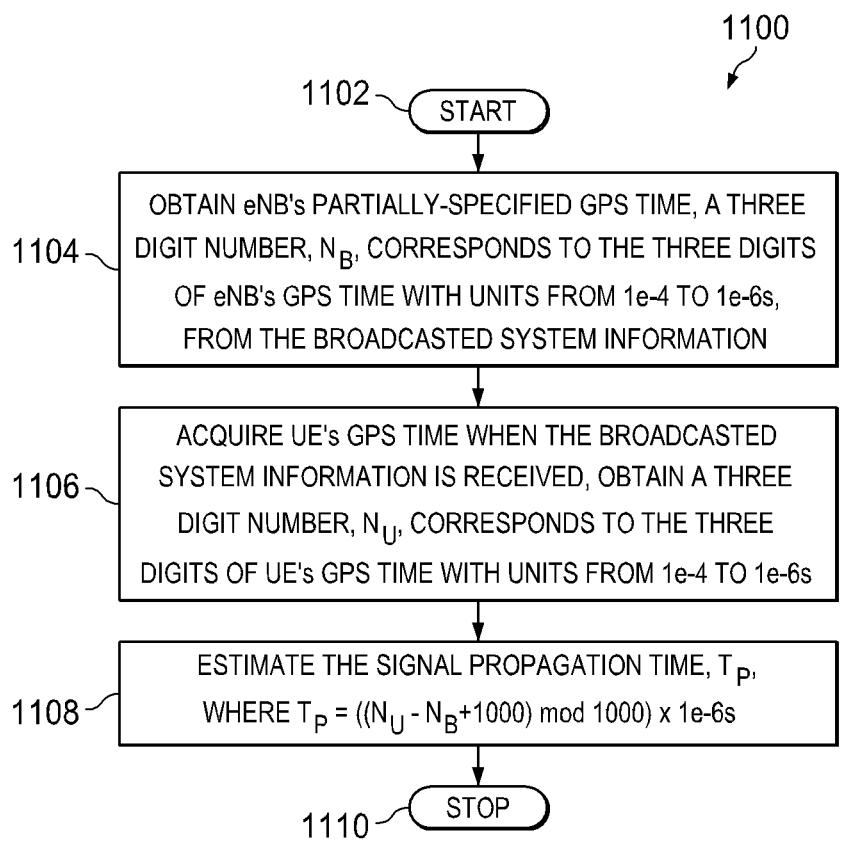
FIG. 11 is a flowchart illustrating the estimation of signal propagation time at the UE based on the partial GPS time information broadcasted by the eNB.

FIG. 11 is a flowchart illustrating the estimation of signal propagation time at the UE based on the partial GPS time information broadcasted by the eNB. In this particular example, the time estimation process 1100 starts at step 1102. Similarly to the distance estimation, the eNB may broadcast system information by including at least a portion of its GPS time. For similar reasons, a full GPS time at which a particular broadcast (such as a particular frame or subframe boundary) was made may not be necessary, and a portion of the GPS time may be sent to save system resource. The maximum possible time advance for E-UTRA specified by the 3GPP LTE standard is 0.67 ms. This maximum time advance can be related to the maxRTD. Thus, the maximum one-way signal propagation time between the eNB and the UE may be half of this value (i.e., 0.34 ms). The eNB may broadcast only a portion of GPS time, for example with units less than 1 ms, and a granularity of 1 μs. Thus, a range of values from 0 to 999 may be used, and 10 information bits can represent this range of values. Turning back to the specific example illustrated in FIG. 11, at step 1104, the UE may obtain a partially-specified GPS time, e.g., a 3 digit number, $N_B$, from the received broadcasted system information from the eNB. This 3 digit number may correspond to the 3 digits of eNB's GPS time with units from 1e-4s to 1e-6s. At step 1106, the UE may determine its own GPS time when the broadcasted system information is received. The UE can also obtain a 3 digit number, $N_U$, which corresponds to the 3 digits of UE's GPS time with units from 1e-4s to 1e-6s. At step 1108, the UE may estimate the signal propagation time, $T_P$, the signal propagation time may be calculated as $T_P=((N_U-N_B+1000) \bmod 1000)\times 1\text{e-}6$ seconds. If the value of $T_P$ resulting from this equation is larger than a certain threshold value, where this threshold may be equal to the maximum possible one-way signal propagation time (i.e. 0.34 ms), then $T_P$ is set equal to zero. The process 1100 ends at step 1110. Accordingly, an estimated OTA_RTD (which is twice the value of the signal propagation time) can be used as the initial time advance to transmit a PRACH preamble. Note that FIG. 11 is an illustrative example only, and that more or fewer digits may be used to broadcast the eNB's GPS time.

Figure 12:
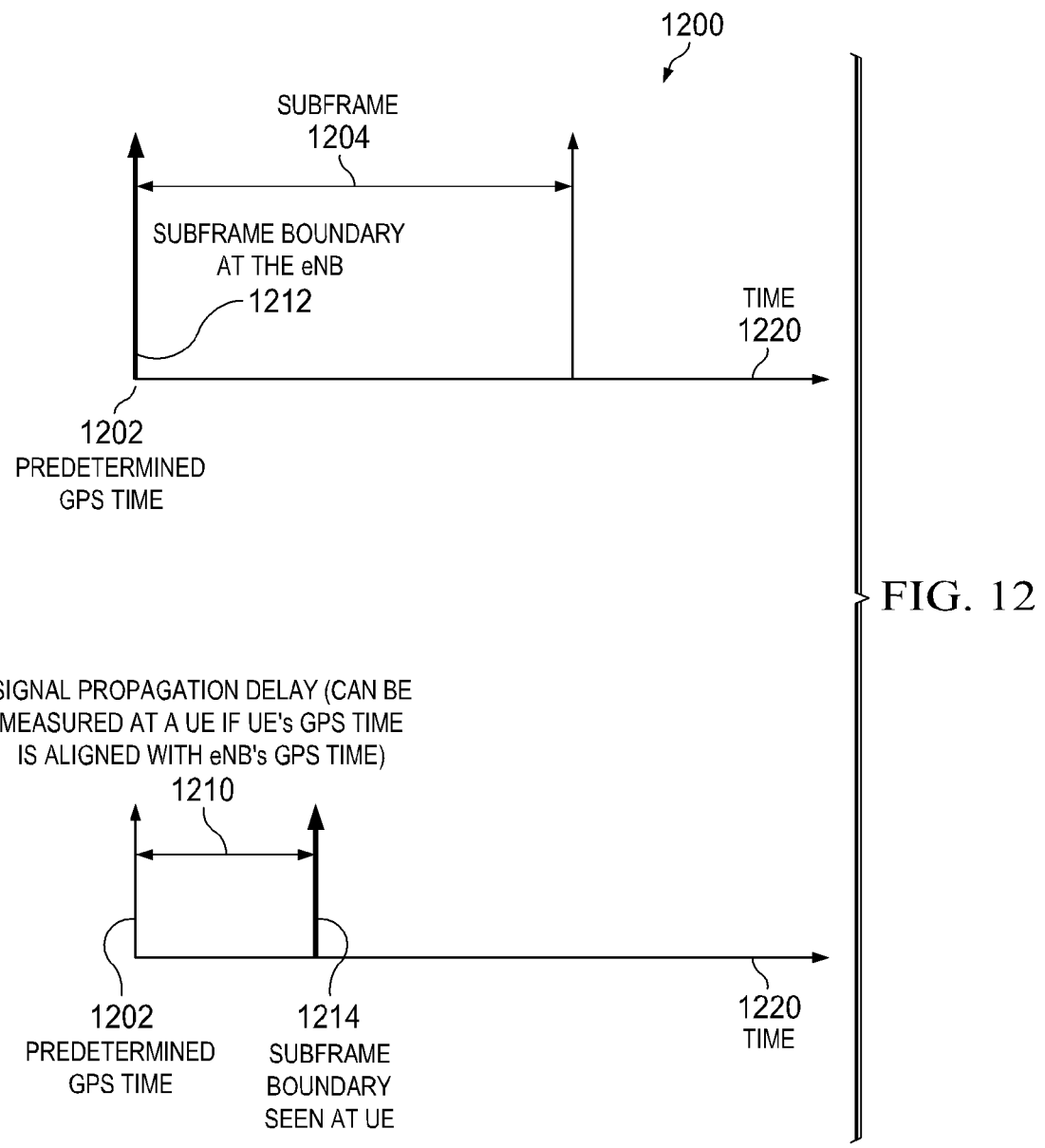
FIG. 12 is an example illustration of the signal propagation time estimation at a UE where the subframe boundary of an eNB signal is aligned with a predetermined time known by the UE and the eNB.

FIG. 12 is an example illustration of the signal propagation time estimation at the UE where the subframe boundary of the eNB signal is aligned with a predetermined time known by the UE and the eNB. In some implementations, the predetermined time can be each integral millisecond of GPS time. For example, an eNB may align its downlink subframe boundary with GPS time=0 (e.g., 0h in Jan. 6, 1980). In other words, the start of each subframe may be aligned with an integral number of milliseconds of GPS time measured from this reference time point. In some implementations, the eNB and the UE may have a common GPS time, by comparing the time of arrival of each subframe with UE's GPS time, the UE may be able to determine the one-way signal propagation time. Note that by aligning the downlink subframe transmission at the eNB to a predetermined time, the GPS time may not need to be explicitly broadcasted by the eNB, since the GPS time of a particular event (e.g. a particular downlink frame/subframe boundary) may be implicitly known at the UE. Thus, further system resources that would otherwise be used for the broadcast transmission of GPS time may be saved. In the particular implementation illustrated in FIG. 12, the predetermined GPS time 1202 with which the eNB may align its downlink subframe boundary 1212 is known at both the eNB and the UE. The eNB can transmit its downlink subframe 1204 with downlink subframe boundary 1212 aligned to the predetermined GPS time 1202. On the UE side, the downlink subframe boundary 1214 seen by the UE from the received signal may be associated with a signal propagation time 1210. This signal propagation delay or time 1210 is the time difference between the predetermined GPS time 1202 and the downlink subframe boundary 1214 seen at the UE.

In some implementations, if a UE cannot obtain a reliable OTA_RTD estimate (e.g., GPS information is not available or the previously estimated OTA_RTD is out-of-date), the UE can choose the conventional PRACH configuration from a dual PRACH configuration (with both conventional and time-advanced preamble transmission approaches). A dual PRACH configuration may be used to support legacy UEs without time-advanced PRACH capability.

In some implementations, the GPS information in a UE can become stale. In such cases, for the initial access, the UE may use the conventional approach. For the time resynchronization, the UE can track the downlink timing change and use the timing change to determine the corresponding change of OTA_RTD compared to the previous OTA_RTD estimated by the UE.

In some implementations, the GPS receiver in a UE may be able to accurately track a UE with high mobility. For example, consider a UE which travels at a speed of 300 km/h (or 83.3 m/s). This traveling speed may correspond to a 0.55 μs timing error per second in a round trip, if the UE moves directly towards or directly away from an eNB. Note that a 1 μs timing error in a round trip may be accounted for in determining the minimum cyclic shift. In some implementations, for a UE with high mobility which may have moved significantly from the time when the OTA_RTD estimation is made to the time when the PRACH is transmitted, a prediction method may be used to forecast the time advance for a PRACH transmission based on the speed of the UE and the time interval between the time of an OTA_RTD is estimated and the time when a PRACH is transmitted.

Figure 13A:
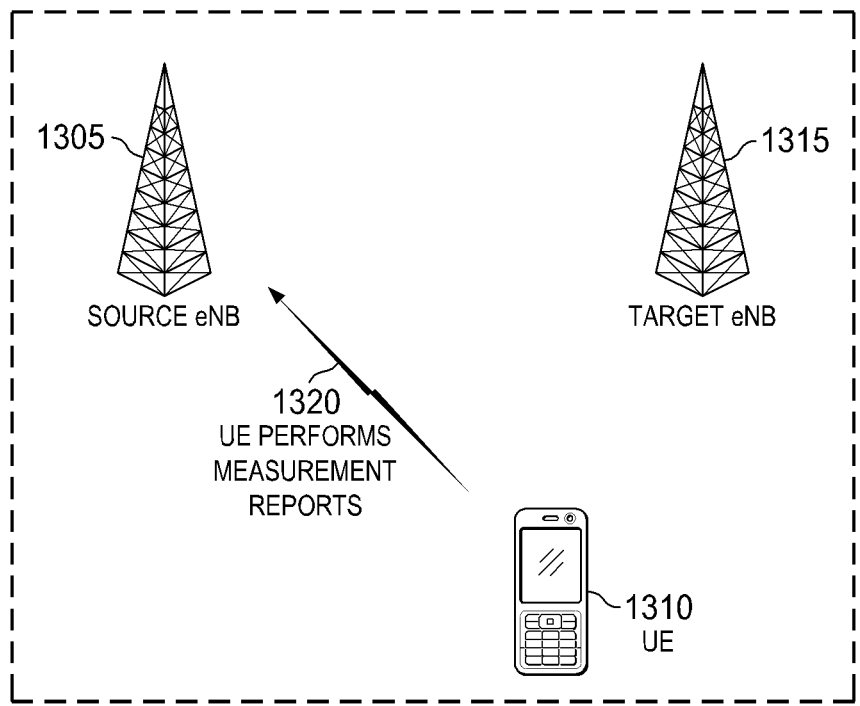
FIGS. 13A-E are schematics illustrating an example overview of actions involved in an E-UTRA handover process.
Figure 13B:
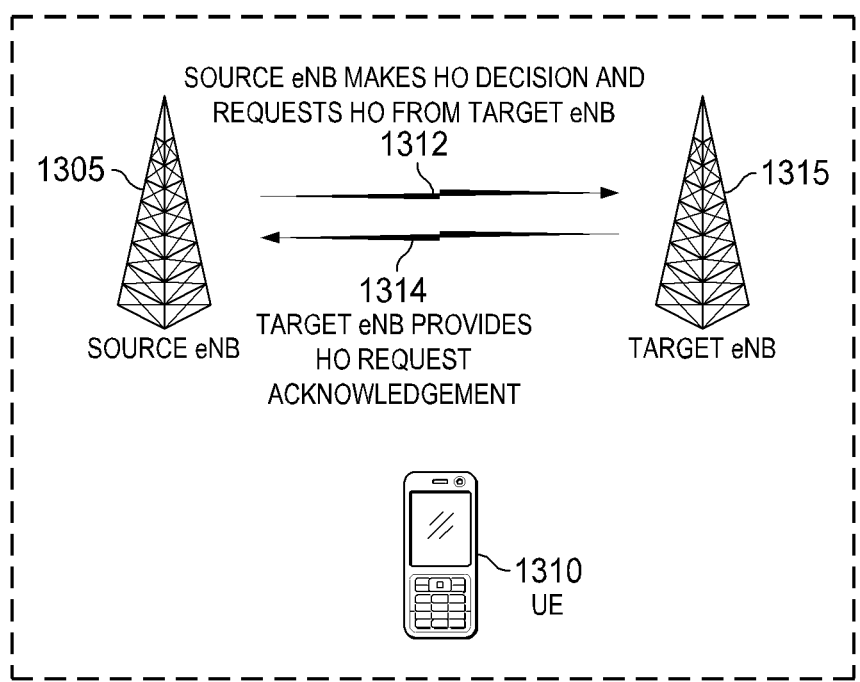
Figure 13C:
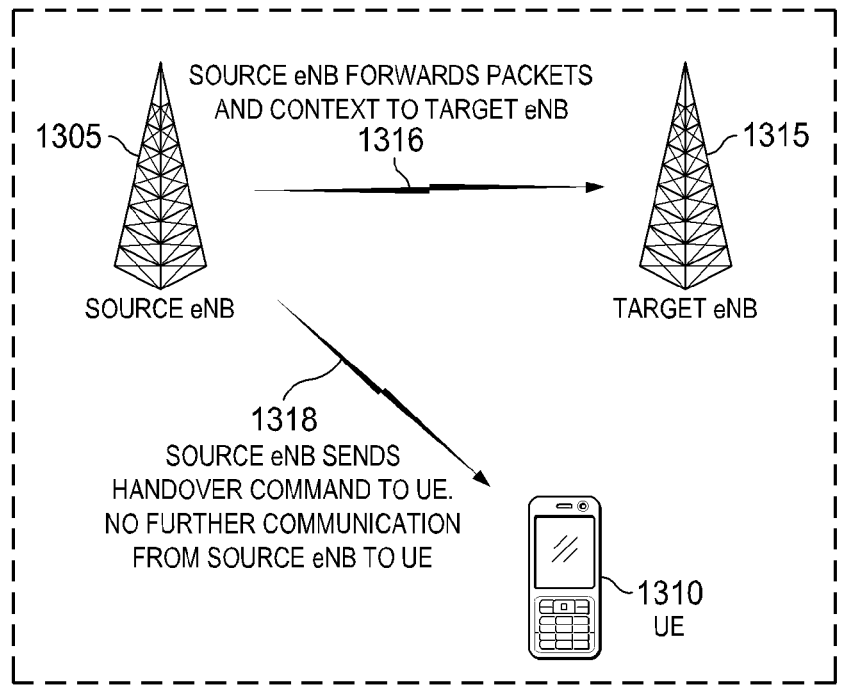
Figure 13D:
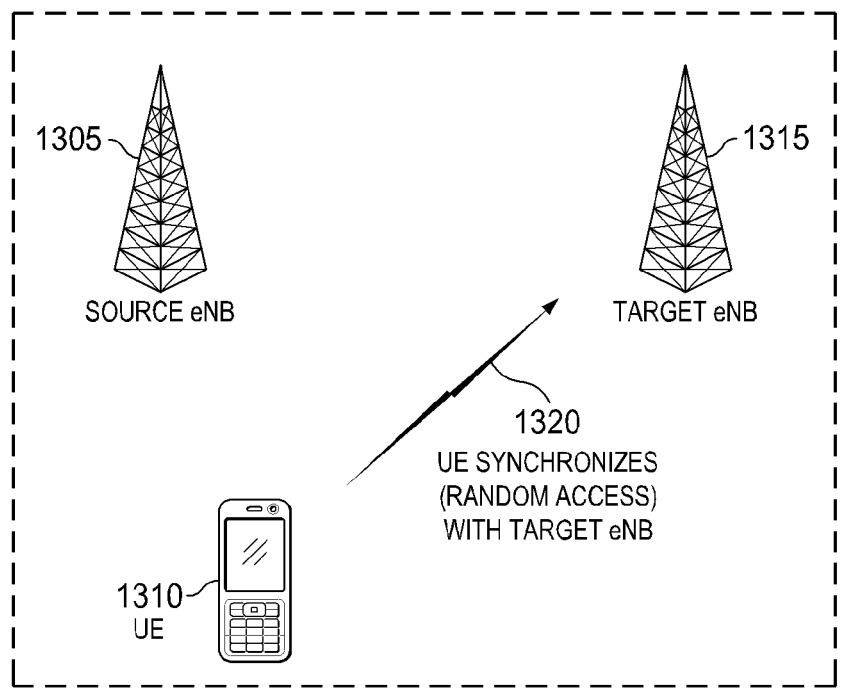
Figure 13E:
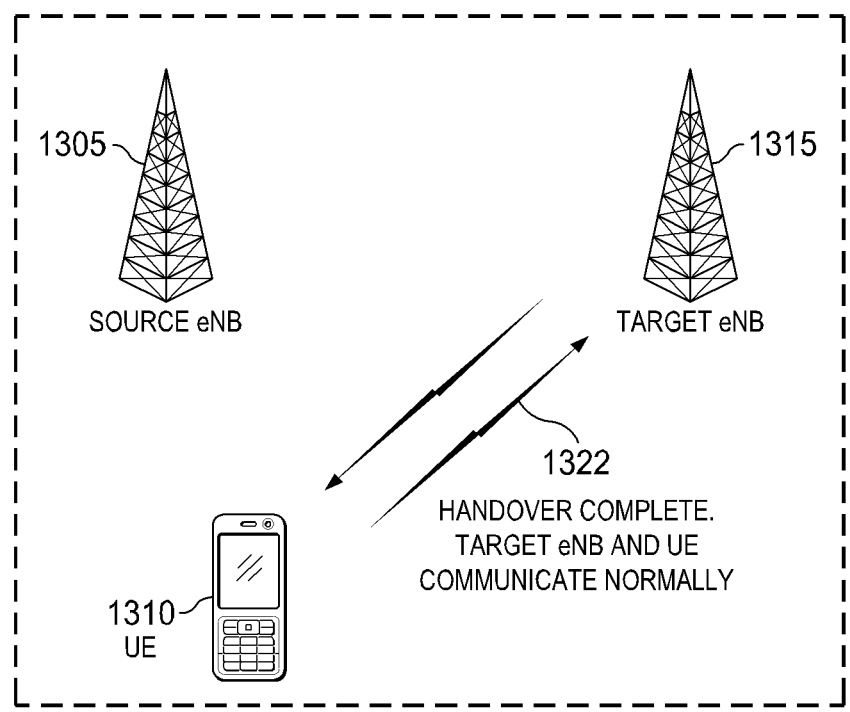

In some implementations, the UE may use methods including time-advanced PRACH preamble transmission in handover situation. In this situation, a UE may travel away from a source eNB to a target eNB and perform random access to the target eNB in order to obtain uplink synchronization with the target eNB. FIGS. 13A-E are schematics illustrating an example overview of actions involved in an E-UTRA handover process. FIG. 13A shows a UE 1310 communicating normally with its source eNB 1305 and providing regular measurement reports 1320 of neighbouring cells (including target cell 1315), based on configured reporting criteria. In FIG. 13B, based on the reported measurements, the source eNB 1305 may decide when a handover can occur. The source eNB 1305 may communicate directly with the target eNB 1315 to request a handover 1312 of the UE 1310. The target eNB 1315 can acknowledge the handover request and provide information 1314 to be forwarded to the UE in order to facilitate the handover. In FIG. 13C, the source eNB 1305 may transmit the handover command and forward information 1318 from the target eNB 1315 to the UE 1310. The source eNB 1305 may also forward buffered packets 1316 associated with the UE 1310 to the target eNB 1315. In FIG. 13D, after receiving the handover command, the UE 1310 may detach from the source eNB 1305, synchronize with the target eNB 1315 (obtaining downlink synchronization with the target eNB 1315 if not already present), perform a random access in order to obtain uplink synchronization with the target eNB 1315, and establish an RRC connection 1320 with the target eNB 1315. In FIG. 13E, following the completion of the handover, the target eNB 1315 and UE 1310 may communicate normally 1322. The PRACH preamble transmission may be performed by the UE 1310 at the step shown in FIG. 13D to obtain uplink synchronization in the cell served by the target eNB 1315.

Figure 14A:
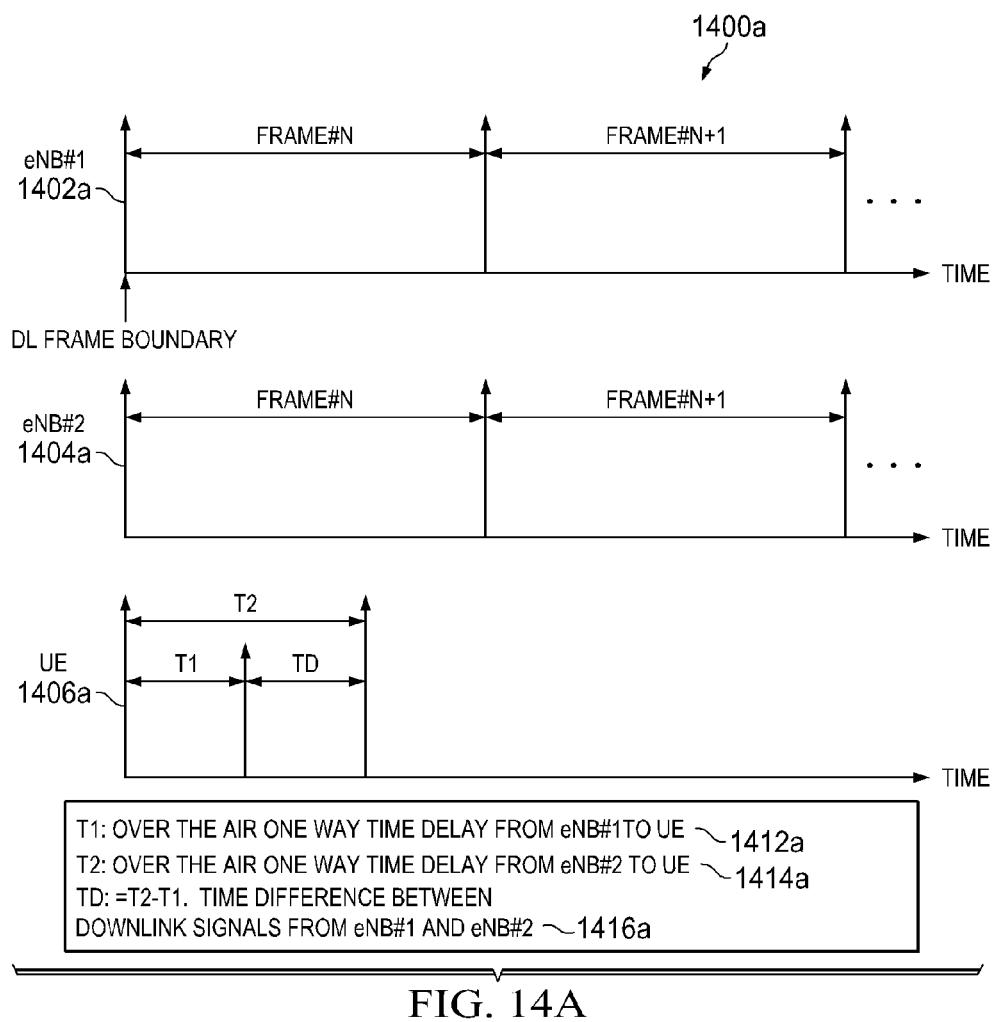
FIGS. 14A-B are example illustrations of the estimate of the downlink signal propagation time difference from a serving eNB and a target eNB to a UE in synchronized and non-synchronized networks.
Figure 14B:
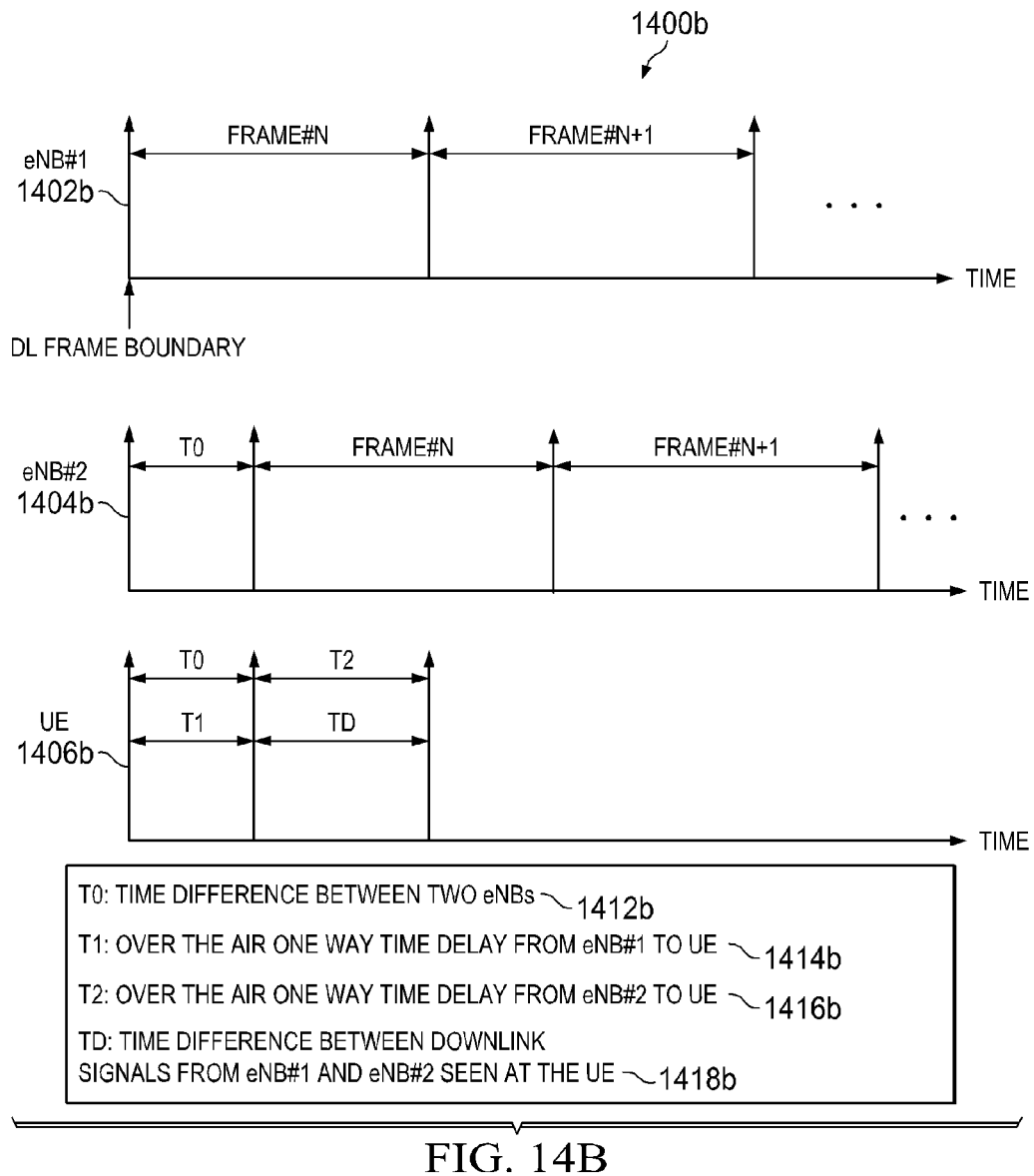

FIGS. 14A-B are example illustrations of the estimate of the downlink signal propagation time difference from a serving eNB and a target eNB to a UE in synchronized and non-synchronized networks. In synchronized networks 1400a, the downlink time difference seen at the UE 1406a is the downlink time difference between the signal propagation delays from two eNBs. As shown in FIG. 14A, if the signal propagation time from eNB#1 1402a to UE 1406a is $t_1$ 1412a, and the signal propagation time from eNB#2 1404a to UE 1406a is $t_2$ 1414a, the downlink time difference, $t_d$ 1416a seen at the UE can be calculated as, $t_d = t_2 - t_1$. A sign of $t_d$ may tell which signal propagation time is shorter. In non-synchronized networks 1400b, the downlink time difference $t_d$ 1418b seen at the UE 1406b is not the actual propagation time difference from eNB#1 1402b and 1404b to the UE 1406b. The actual propagation time difference $t_d'$ is the signal propagation time $t_2$ 1416b from eNB#2 1404b to UE 1406b minus the signal propagation time $t_1$ from eNB#1 1402b to the UE 1406b, i.e., $t_d' = t_2 - t_1$. However, the downlink time difference seen at the UE 1406b is $t_d = t_d' + t_0$, where $t_0$ 1412b is the time difference between two eNBs. Thus, the actual propagation time difference can also be written as $t_d' = t_d - t_0$.

In some implementations, a UE can use GPS information to estimate the OTA_RTD for a target cell. The estimate can also be a time advance estimate used by the UE for the PRACH transmissions in the target cell. In some applications, an eNB can calculate the time advance that a UE can use in the target cell uplink transmission. This calculation may be based on the eNB time difference between the source cell and the target cell in a non-synchronized cellular network (e.g., $t_0$ in FIG. 14B) and a UE reported timing difference between downlink signals (e.g., $t_d$ in FIG. 14B). Thus, the time advance estimate can be given by, OTA_RTD=$2 \times (t_d - t_0) = 2t_d'$. The eNB may then signal the estimated time advance to the UE. Consequently, a UE can use the estimated time advance in the target cell to send a PRACH preamble comprising a handover preamble sequence to the target cell. In some implementations, UEs using the time-advanced PRACH transmission may share the same PRACH region allocated for legacy UEs.

In some implementations, the target cell may support a dual PRACH configuration. An eNB may be aware of whether a UE is using or is capable of using the time-advanced PRACH preamble in random access (e.g., through UE capability information and/or by having the source eNB provide this information to the target eNB as part of the handover request message) and provide the appropriate PRACH configurations as part of the handover message. In some implementations, the eNB may provide both sets of PRACH configurations and allow the UE to decide which configuration set to use when performing a random access procedure with the target cell. In such case, the UE may use the time-advanced PRACH configuration, since it can be expected that more PRACH resources may be allocated for the configuration. However, if the UE is not able to use a given time-advanced PRACH configuration and the UE falls back to the legacy PRACH configuration, then the UE may encounter a slower random access connection time. This may results from, e.g., fewer PRACH resources being allocated for the legacy configuration. In some implementations, the target eNB can provide its GPS location within a new information element contained within the handover command.

In some implementations, e.g., in E-UTRA Release-10, carrier aggregation may be implemented by an eNB. The eNB may have multiple downlink and/or uplink carriers (at different frequencies), and Release-10 UEs may be able to transmit and receive data in parallel on more than one carrier. In such case, the system information for one carrier may contain one PRACH configuration (e.g. for the use of Release-8 UEs) while the system information for a second carrier (which may be associated with the same eNB) may contain a different PRACH configuration for the use of UEs which can use the time-advanced PRACH preamble. In such case, providing a dual PRACH configuration within the same system information block may not be necessary. However, having two (or more) different PRACH configurations associated with the same eNB may still be allowed. In carrier aggregation, the UE may perform a random access on its Primary Component Carrier (PCC), and additional carriers that are also assigned to that UE are termed Secondary Component Carriers (SCC). When a UE is being handed over to a multi-carrier eNB, the UE's new PCC for the target cell can be assigned to the particular carrier which may have a PRACH configuration matching the UE's capabilities (e.g., a PRACH format with a longer CP for legacy Release-8 UEs, or a PRACH format with a shorter CP for UEs which can perform time-advanced PRACH preamble transmission). For example, a legacy UE may be handed over to carrier 1 for use as the UE's PCC, where the system information for carrier 1 includes a PRACH configuration intended for the use of legacy UEs. Conversely, a UE which can perform time-advanced PRACH configuration may be handed over to carrier 2 for use as the UE's PCC (with carrier 1 potentially being used as an SCC for that UE). This may allow the UE which can perform time-advanced PRACH transmission to use the PRACH configuration intended for non-legacy UEs, since the UE may be able to use the system information associated with carrier 2.

Figure 15:
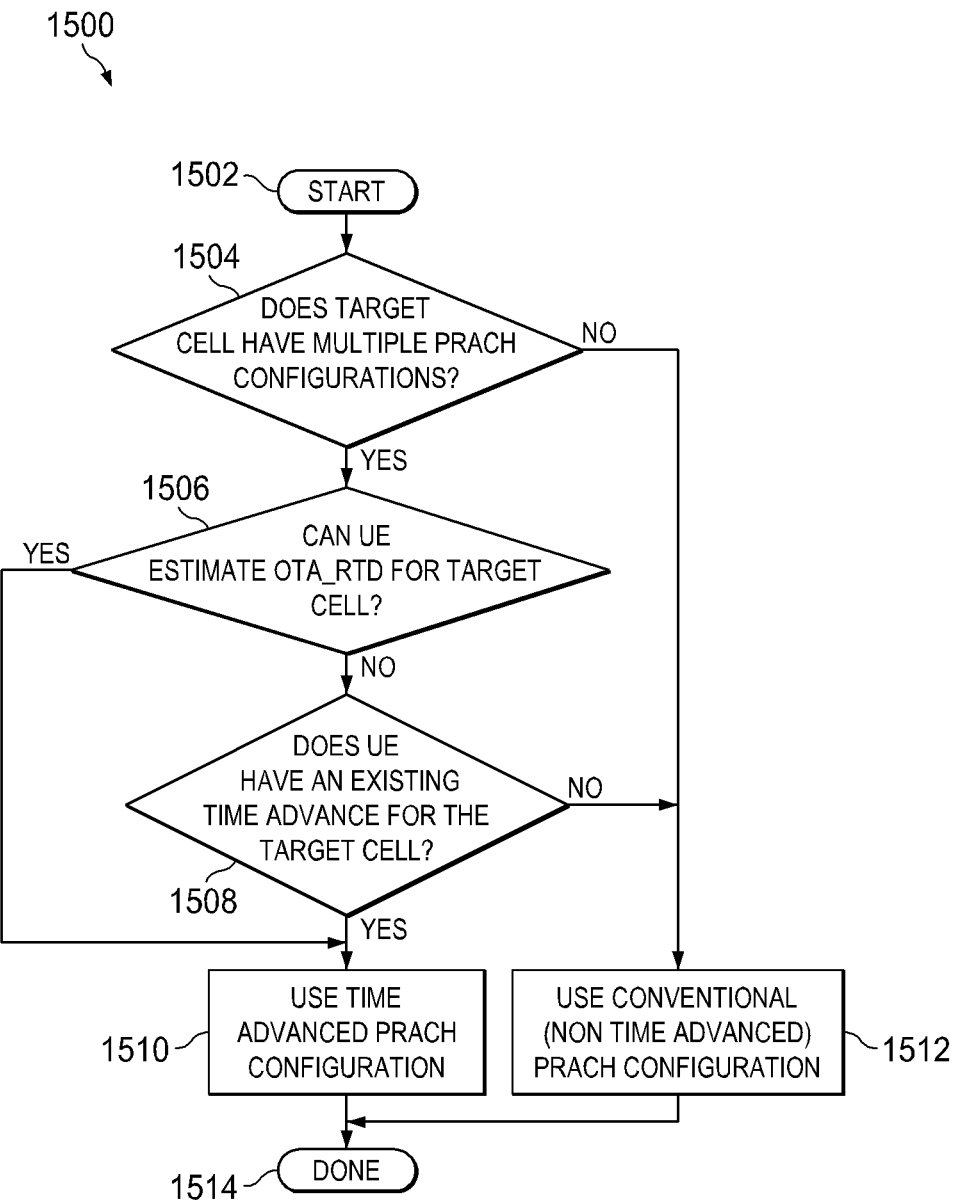
FIG. 15 is a flowchart illustrating an example method of determining whether to use a time-advanced or non-time advanced PRACH configuration at the UE.

FIG. 15 is a flowchart illustrating an example method of determining whether to use a time-advanced or non-time advanced PRACH configuration at the UE. The example method 1500 starts at step 1502. At decisional step 1504, the UE determines if the target eNB has time-advanced PRACH preamble capability. In some implementations, the eNB which can support the time-advanced PRACH preamble may also support legacy UEs with conventional PRACH preamble. Accordingly, the presence of a dual-PRACH configuration may be an indication to the UEs on whether time-advanced preamble transmission can be supported or both conventional and time-advanced preamble transmission can be supported. If the target cell has multiple PRACH configurations, the UE can continue to decisional step 1506 where the UE determines whether it can estimate a time advance value using an OTA_RTD estimate. Otherwise, the UE proceeds to step 1512 where the conventional PRACH configuration is used. If the UE can estimate the OTA_RTD for the target cell at step 1506, the process continues to step 1510 where the UE can use the time-advanced PRACH configuration. Otherwise, the UE may determine whether it can use an existing time advance at decisional step 1508. If yes, the UE can perform random access using a time-advanced PRACH configuration at step 1510. Otherwise, the UE can use the conventional PRACH configuration at step 1512. The process 1500 ends at step 1514.

In some implementations, e.g., implementations for a paging response, UEs may send a PRACH preamble as an initial step to acquire an updated time advance. In such case, UEs may track the downlink timing change and use the downlink timing change to estimate the uplink timing. Further, if a UE's uplink timing can be considered as on track, the UE may use time-advanced PRACH for random access. Otherwise, the UE may use the conventional PRACH transmission.

In some implementations, a UE may not receive responses from the eNB after issuing a series of scheduling requests for uplink transmission resources, i.e., no uplink grant is provided by the eNB. In such case, the UE may also initiate a random access procedure. A UE with a configured scheduling request physical uplink control channel (PUCCH) resource may be in the RRC_CONNECTED state and may be considered to have uplink synchronization with the eNB. Note that the UE may first release its PUCCH resources if the UE initiates a random access procedure following a sequence of unanswered scheduling requests. Consequently, the UE can transmit a PRACH preamble with the UE's current uplink time advance, rather than with a zero time advance specified in the 3GPP LTE standard Release-8 random access procedure. If the UE's uplink time advance is still reasonably accurate, the time-advanced PRACH preamble may be received at the eNB approximately synchronized with the expected uplink subframe boundaries. Thus, detection of a preamble transmission at the eNB may be easier.

In some implementations, an RRC_CONNECTED UE may lose uplink synchronization during extended periods of zero traffic. In other words, the eNB may choose not to maintain the uplink synchronization for a UE if the eNB can observe no downlink and/or uplink traffic for the UE during an extended period of time. When new downlink traffic arrives at the eNB, the eNB may issue a command to the non-synchronized UE instructing it to perform a random access procedure in order to regain uplink synchronization. If the UE can estimate an approximate uplink time advance based on the measured downlink propagation time, the UE may be able to transmit its PRACH preamble with this estimated uplink time advance in order to assist the eNB with detecting the preamble transmission.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method, comprising:
receiving, by a wireless electronic device, a broadcast signal from a first base station, the broadcast signal including a portion of a first Global Positioning System (GPS) time, the first GPS time determined by the first base station and explicitly identifying when the first base station sends the broadcast signal, wherein the portion of the first GPS time includes a predetermined set of digits of the first GPS time;
determining, by the wireless electronic device, a second GPS time identifying when the wireless electronic device receives the broadcast signal;
identifying, by the wireless electronic device, a portion of the second GPS time, wherein the portion of the second GPS time includes a predetermined set of digits of the second GPS time, and the portion of the second GPS time has a same number of digits as the portion of the first GPS time;
estimating, by the wireless electronic device, a signal propagation time between the base station and the wireless electronic device based on the portion of the first GPS time information included in the broadcast signal and based on the portion of the second GPS time;
determining, by the wireless electronic device, a timing advance for uplink signal synchronization at the first base station based on the signal propagation time;
determining, by the wireless electronic device, a preamble start time based, at least in part, on a time that a downlink signal transmitted by the first base station is received by the wireless electronic device and the timing advance; and
transmitting, by the wireless electronic device, at the preamble start time, a random access preamble to the first base station.

2. The method of claim 1, wherein the broadcast signal is associated with a transmission time aligned with a predetermined GPS time.

3. The method of claim 1, wherein the preamble start time is further based on a safety margin value.

4. The method of claim 1, wherein transmitting the random access preamble initiates an uplink connection between the wireless electronic device and the first base station.

5. The method of claim 1, further comprising selecting a random access preamble format from a plurality of random access preamble formats.

6. The method of claim 5, further comprising selecting the random access preamble from a set of random access preambles associated with the selected random access preamble format.

7. The method of claim 5, wherein selecting the random access preamble format from the plurality of random access preamble formats received from the first base station is based, at least in part, on comparing, by the wireless electronic device, at least one of a signal propagation time from the first base station to the wireless electronic device to a first threshold and a received signal strength from the first base station to a second threshold.

8. The method of claim 1, wherein determining the timing advance comprises receiving a timing advance signal from a second base station.

9. An apparatus for managing downlink interference, the apparatus operating in a cell associated with a corresponding serving first base station and comprising:
an antenna;
a memory; and
at least one hardware processor, the hardware processor operable to execute instructions to:
receive a broadcast signal from the first base station, the broadcast signal including a portion of a first Global Positioning System (GPS) time, the first GPS time determined by the first base station and explicitly identifying when the first base station sends the broadcast signal, wherein the portion of the first GPS time includes a predetermined set of digits of the first GPS time;
determine a second GPS time identifying when the wireless electronic device receives the broadcast signal;
identify a portion of the second GPS time, wherein the portion of the second GPS time includes a predetermined set of digits of the second GPS time, and the portion of the second GPS time has a same number of digits as the portion of the first GPS time;
estimate a signal propagation time between the base station and the wireless electronic device based on the portion of the first GPS time information included in the broadcast signal and based on the portion of the second GPS time;
determine a timing advance for uplink signal synchronization at the first base station based on the signal propagation time;
determine a preamble start time based, at least in part, on a time that a downlink signal transmitted by the first base station is received by the wireless electronic device and the timing advance; and
transmit, at the preamble start time, a random access preamble to the first base station.

10. The apparatus of claim 9, wherein the broadcast signal is associated with a transmission time aligned with a predetermined GPS time.

11. The apparatus of claim 9, wherein the preamble start time is further based on a safety margin value.

12. The apparatus of claim 9, wherein transmitting the random access preamble initiates an uplink connection between the wireless electronic device and the first base station.

13. The apparatus of claim 9, the processor further operable to execute instructions to select a random access preamble format from a plurality of random access preamble formats.

14. The apparatus of claim 13, the processor further operable to execute instructions to select the random access preamble from a set of random access preambles associated with the selected random access preamble format.

15. The apparatus of claim 13, wherein selecting the random access preamble format from the plurality of random access preamble formats received from the first base station is based, at least in part, on comparing at least one of a signal propagation time from the first base station to the wireless electronic device to a first threshold and a received signal strength from the first base station to a second threshold.

16. The apparatus of claim 9, wherein the processor operable to execute instructions to determine the timing advance comprises the processor operable to execute instructions to receive a timing advance signal from a second base station.

17. A system comprising:
a first base station in communication with a wireless electronic device, the first base station operable to:
broadcast a first signal including at least a first random access preamble format, a first root sequence, and a first cyclic shift that to be used by the wireless electronic device to generate and transmit a first random access preamble with a first timing advance, the first signal also including a portion of a first Global Positioning System (GPS) time, the first GPS time determined by the first base station and explicitly identifying when the first signal sent out, wherein the portion of the first GPS time includes a predetermined set of digits of the first GPS time, and the first timing advance is relative to a downlink signal received at the wireless electronic device to cause signals from wireless electronic devices to arrive synchronized at the first base station; and
receive the first random access preamble from the wireless electronic device;
the wireless electronic device operable to:
receive the first signal from the first base station;
determine a second GPS time identifying when the wireless electronic device receives the first signal;
identify a portion of the second GPS time, wherein the portion of the second GPS time includes a predetermined set of digits of the second GPS time, and the portion of the second GPS time has a same number of digits as the portion of the first GPS time;
estimate a signal propagation time between the base station and the wireless electronic device based on the portion of the first GPS time and the portion of the second GPS time;
determine the first timing advance based on the signal propagation time; and
transmit the first random access preamble to the first base station using the first timing advance.

18. The system of claim 17, wherein a second signal similar to the first signal is broadcast by the first base station and has a transmission time which is aligned to a predetermined reference time.

19. The system of claim 17, wherein the first signal broadcast by the first base station further includes a second random access preamble format, a second root sequence, and a second cyclic shift that is used by the wireless electronic device to generate and transmit a second random access preamble with a second time advance of zero, and the first base station is further operable to receive the second random access preamble from the wireless electronic device.

20. The system of claim 17, wherein a third signal transmitted by a first base station to the wireless electronic device includes a third time advance to be used by the wireless electronic device to transmit a third random access preamble to a second base station.

* * * * *